(12) United States Patent
Bose et al.

(10) Patent No.: US 6,526,354 B2
(45) Date of Patent: Feb. 25, 2003

(54) SONIC WELL LOGGING FOR ALTERATION DETECTION

(75) Inventors: Sandip Bose, Bridgeport, CT (US); Ramachandra Ganesh Shenoy, Paris (FR)

(73) Assignee: Schlumberger Technology Corporation, Ridgefield, CT (US)

(*) Notice: Subject to any disclaimer, the term of this patent is extended or adjusted under 35 U.S.C. 154(b) by 0 days.

(21) Appl. No.: 09/741,573

(22) Filed: Feb. 1, 2001

(65) Prior Publication Data

US 2003/0010494 A1 Jan. 16, 2003

(51) Int. Cl.$^7$ ................................................ G01V 1/40
(52) U.S. Cl. ............................................. 702/14; 703/5
(58) Field of Search ....................... 702/14, 17; 367/31, 367/73; 703/5, 10; 324/303

(56) References Cited

U.S. PATENT DOCUMENTS

| | | | | |
|---|---|---|---|---|
| 5,197,038 A | | 3/1993 | Chang et al. ............... | 367/28 |
| 5,381,092 A | * | 1/1995 | Freedman | |
| 5,398,215 A | | 3/1995 | Sinha et al. ................ | 367/31 |
| 5,475,650 A | | 12/1995 | Sinha et al. ................ | 367/31 |
| 5,798,982 A | * | 8/1998 | He et al. .................... | 367/73 |
| 5,838,633 A | | 11/1998 | Sinha ......................... | 367/31 |
| 5,968,109 A | * | 10/1999 | Israni et al. ................ | 701/208 |
| 6,449,560 B1 | * | 9/2002 | Kimball ...................... | 702/6 |

FOREIGN PATENT DOCUMENTS

| | | | | |
|---|---|---|---|---|
| GB | 2 313 667 | 12/1997 | ............ | G01V/1/48 |
| WO | WO 00/31568 | 6/2000 | ............ | G01V/1/48 |
| WO | WO 01/63322 | 8/2001 | | |

OTHER PUBLICATIONS

Alford, R.M. *Shear Data in the Presence of Azimuthal Anisotropy.* 56$^{th}$ Ann. Int'l Soc. Expl. Geophys., Expanded Abstracts. (1986) pp. 476–479.

Burridge, R. and Sinha, B.K. *Inversion for Formation Shear Modulus and Radial Depth of Investigation Using borehole Flexural Waves.* SDR Research Report GEO–002–96–10 (Mar. 21, 1996).

* cited by examiner

Primary Examiner—Edward Lefkowitz
Assistant Examiner—Victor J. Taylor
(74) Attorney, Agent, or Firm—Martin M. Novack; William B. Batzer; John J. Ryberg

(57) ABSTRACT

A method for determining alteration of a region of an earth formation surrounding an earth borehole, comprising the steps of providing a logging device that is moveable through the borehole; transmitting sonic energy into the formation and receiving, at a plurality of transmitter-to-receiver spacings, sonic energy that has traveled through the formation, and producing signals representative of the received sonic energy for the plurality of transmitter-to-receiver spacings; determining sonic transit times and differential transit times for the respective transmitter-to-receiver spacings; deriving a test statistic from the differential transit times; and determining the presence of alteration of a region of the formations from the test statistic. An associated apparatus for carrying out the method is also described.

35 Claims, 20 Drawing Sheets

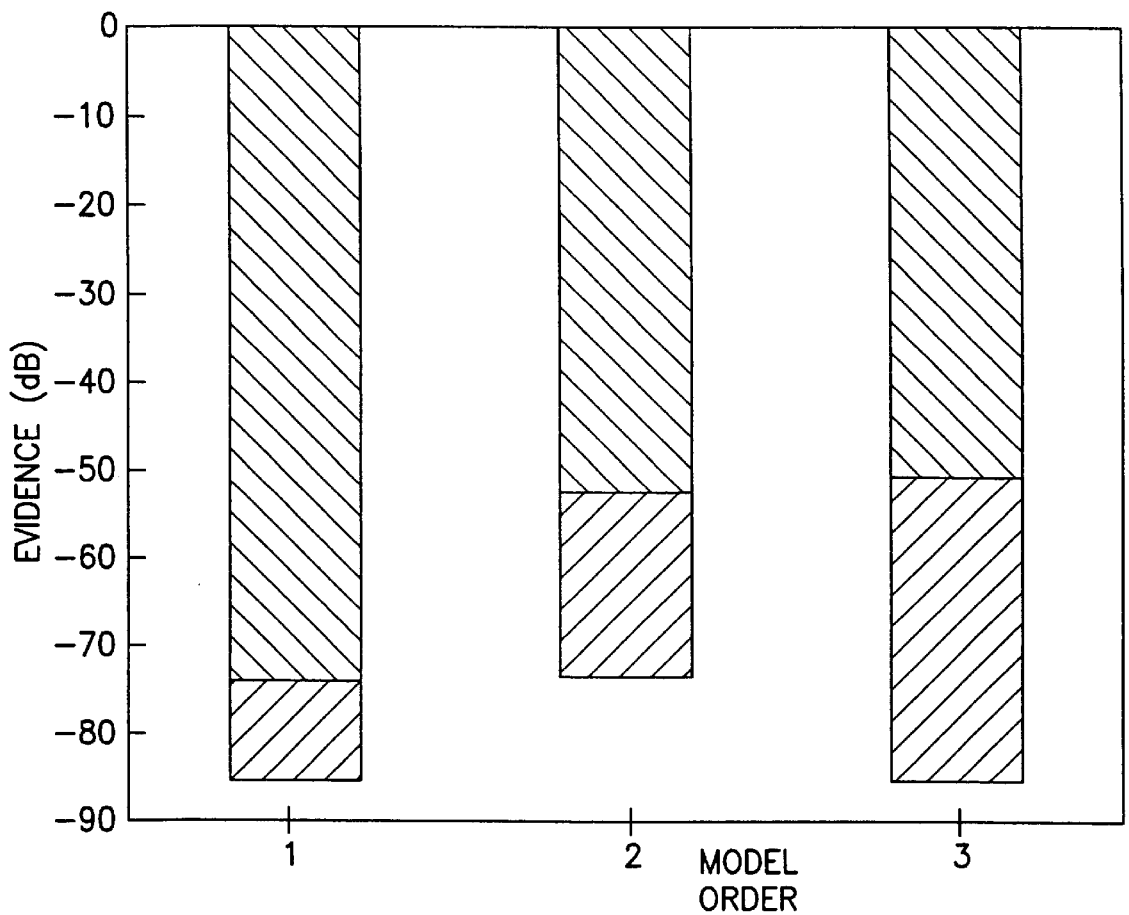
FIG.16

SONIC WELL LOGGING FOR ALTERATION DETECTION

RELATED APPLICATION

The present application contains subject matter that is related to subject matter in copending U.S. patent application Ser. No. 09/741574, entitled "Sonic Well Logging for Characterizing Earth Formations", Attorney Docket Number 60.1406, incorporated herein by reference, filed of even date herewith, and assigned to the same assignee as the present application.

FIELD OF THE INVENTION

This invention relates to investigation of earth formations, to a method and apparatus for determining properties of earth formations using sonic well logging which can characterize earth formations exhibiting complex acoustic behavior, such as can occur in anisotropic and/or inhomogeneous formations, and to a method and apparatus for determining alteration of a region of formations surrounding an earth borehole.

BACKGROUND OF THE INVENTION

It is well known that mechanical disturbances can be used to establish acoustic waves in earth formations surrounding a borehole, and the properties of these waves can be measured to obtain important information about the formations through which the waves have propagated. Parameters of compressional, shear and Stoneley waves, such as their velocity (or its reciprocal, slowness) in the formation and in the borehole, can be indicators of formation characteristics that help in evaluation of the location and/or producibility of hydrocarbon resources.

An example of a logging device that has been used to obtain and analyze sonic logging measurements of formations surrounding an earth borehole is called a Dipole Shear Sonic Imager ("DSI"—trademark of Schlumberger), and is of the general type described in Harrison et al., "Acquisition and Analysis of Sonic Waveforms From a Borehole Monopole And Dipole Source For The Determination Of Compressional And Shear Speeds And Their Relation To Rock Mechanical Properties And Surface Seismic Data", Society of Petroleum Engineers, SPE 20557, 1990. In conventional use of the DSI logging tool, one can present compressional slowness, $\Delta t_c$, shear slowness, $\Delta t_s$, and Stoneley slowness, $\Delta t_{st}$, each as a function of depth, z. [Slowness is the reciprocal of velocity and corresponds to the interval transit time typically measured by sonic logging tools.] Typically, the subsurface formations are considered to be homogeneous and isotropic material, where the compressional and shear velocities, $V_c$ and $V_s$, of the formations are only a function of depth.

It is known that formations can be anisotropic, where the compressional and shear slownesses are a function of azimuth, θ. Anisotropy can occur, for example because of layered shales, aligned fractures or differences in the magnitudes of the principal stresses in the formations.

It is also known that formations may be inhomogeneous, where the slownesses become a function of radial distance r, from the borehole. Inhomogeneity can be caused, for example, by mud-shale interactions or by mechanical damage due to stress concentrations.

It is among the objectives of the present invention to provide an improved technique for characterizing earth formations exhibiting complex acoustic behavior. It is among the further objects of the invention to provide an improved technique and apparatus for detecting alteration of a region of earth formations surrounding a borehole.

SUMMARY OF THE INVENTION

A form hereof provides a technique for jointly processing monopole and dipole measurements from a sonic logging device to obtain a more complete characterization of the acoustic behavior of formations surrounding an earth borehole. From an integrated sonic inversion, improved estimates of slowness, as well as characterization of the near wellbore damage region, can be obtained.

In accordance with a form hereof, a method is set forth for determining properties of an earth formation surrounding an earth borehole, comprising the following steps: (a) providing a logging device that is moveable through the borehole; (b) transmitting sonic energy into the formation, receiving, at the logging device, sonic energy that has travelled through the formation, and producing signals representative of the received sonic energy; (c) determining, from the signals, whether the formation is anisotropic; (d) determining, from the signals, whether said formation is inhomogeneous; and (e) responsive to the determinations of steps (c) and (d), outputting a characterization of the formation as one of the following types: isotropic/homogeneous, anisotropic/homogeneous, isotropic/inhomogeneous, and anisotropic/inhomogeneous. In an embodiment of this form of the technique, the step (b) includes transmitting sonic energy from a monopole source, and receiving sonic energy from the monopole source at a plurality of different transmitter-to-receiver spacings on the logging device, and the step (d) includes determining whether said formation is inhomogeneous from deviations between signals at different transmitter-to-receiver spacings. In this embodiment, the step (b) also includes transmitting dipole shear sonic energy, receiving dipole shear sonic energy that has travelled through the formation, and producing signals representative of the received sonic energy over a range of frequencies, and the step (c) includes determining whether the formation is anisotropic from said signals. It will be understood that the step of transmitting dipole shear sonic energy can comprise producing what is commonly referred to as a flexural wave by employing a dipole source in the borehole to cause a flexing of the borehole wall.

In a further form hereof, a method is set forth for determining properties of an earth formation surrounding an earth borehole, comprising the following steps: (a) providing a logging device that is moveable through the borehole; (b) transmitting monopole and dipole sonic energy from the logging device into the formations and receiving, at the logging device, monopole and dipole sonic energy that has travelled through the formations, and producing measurement signals representative of the received monopole and dipole sonic energy; (c) devising a plurality of formation models of different complexities; (d) comparing model signals from the models with the measurement signals; and (e) selecting one of the models based on said comparing step. In an embodiment of this form of the invention, the plurality of models includes four models, the models, in order of increasing complexity, being a homogeneous/isotropic model, a homogeneous/anisotropic model, an inhomogeneous/isotropic model, and an inhomogeneous/anisotropic model. Also in this embodiment, the step (e) selection of a model takes into account model complexity as well as the results of the comparing step.

A feature of the new sonic characterization of a form hereof is that a joint processing of compressional and shear data is being used to indicate the "state" of the formation, in the context of inhomogeneity and/or anisotropy. This "state" of the formation would be a function of depth. Some of the applications fall into two general categories; those requiring "undamaged" parameters, and those applications requiring "damaged" parameters. "Undamaged" parameters (the velocities $V_p$ and $V_s$ of the virgin formation) can be used by geophysics and petrophysics experts to evaluate the reservoir and overburden rock in the traditional manner. With the method hereof, there will be improved confidence that the measurements have a deep enough depth of investigation to be representative of the undamaged formation.

Near wellbore "damaged" parameters are new information of use to drilling and completions engineers. As an example, for inhomogeneity in a reservoir caused by stress concentrations, the location of damaged zones can influence the completion and perforating strategy. One can selectively perforate to avoid damaged zones. Also, detection of damage from sonics can have an impact on other logging measurements that have shallow depths of investigations, so suitable adjustments can be made.

In accordance with a form of the present invention, there is set forth a method for determining alteration of a region of an earth formation surrounding an earth borehole, comprising the following steps: providing a logging device that is moveable through the borehole; transmitting sonic energy into the formation and receiving, at a plurality of transmitter-to-receiver spacings on the logging device, sonic energy that has traveled through the formation, and producing signals representative of the received sonic energy for the plurality of transmitter-to-receiver spacings; determining, from the signals, sonic transit times and differential transit times for the respective transmitter-to-receiver spacings; deriving a test statistic from the differential transit times; and determining the presence of alteration of a region of the formations from the test statistic. In a preferred embodiment of this form of the invention, the test statistic includes a component that depends on the degree to which the differential transit times decrease monotonically as a function of transmitter-to-receiver spacing, and the step of determining the presence of alteration of a region of the formations from the test statistic comprises comparing the test statistic to a threshold.

An embodiment of the invention employs a test statistic $T_1$ of the form $$T_1 = \frac{\sum_i (DTT_i - \overline{DTT})^2}{\min_{m<0,c} \sum_i (DTT_i - mTR_i - c)^2}$$

where $DTT_i$ are the individual differential transit times, $\overline{DTT}$ is the average of the differential transit times, $TR_i$ are the individual transmitter-to-receiver spacings, and m and c are constants.

Further features and advantages of the invention will become more readily apparent from the following detailed description when taken in conjunction with the accompanying drawings.

BRIEF DESCRIPTION OF THE DRAWINGS

FIG. 6, which includes

FIG. 9, which includes

FIG. 11, which includes

FIG. 12, which includes

FIG. 13, which includes

FIG. 14, which includes

FIG. 16 illustrates an example of determining the number of dispersion curves resulting from dipole data, using a likelihood factor approach.

DETAILED DESCRIPTION

Figure 1:
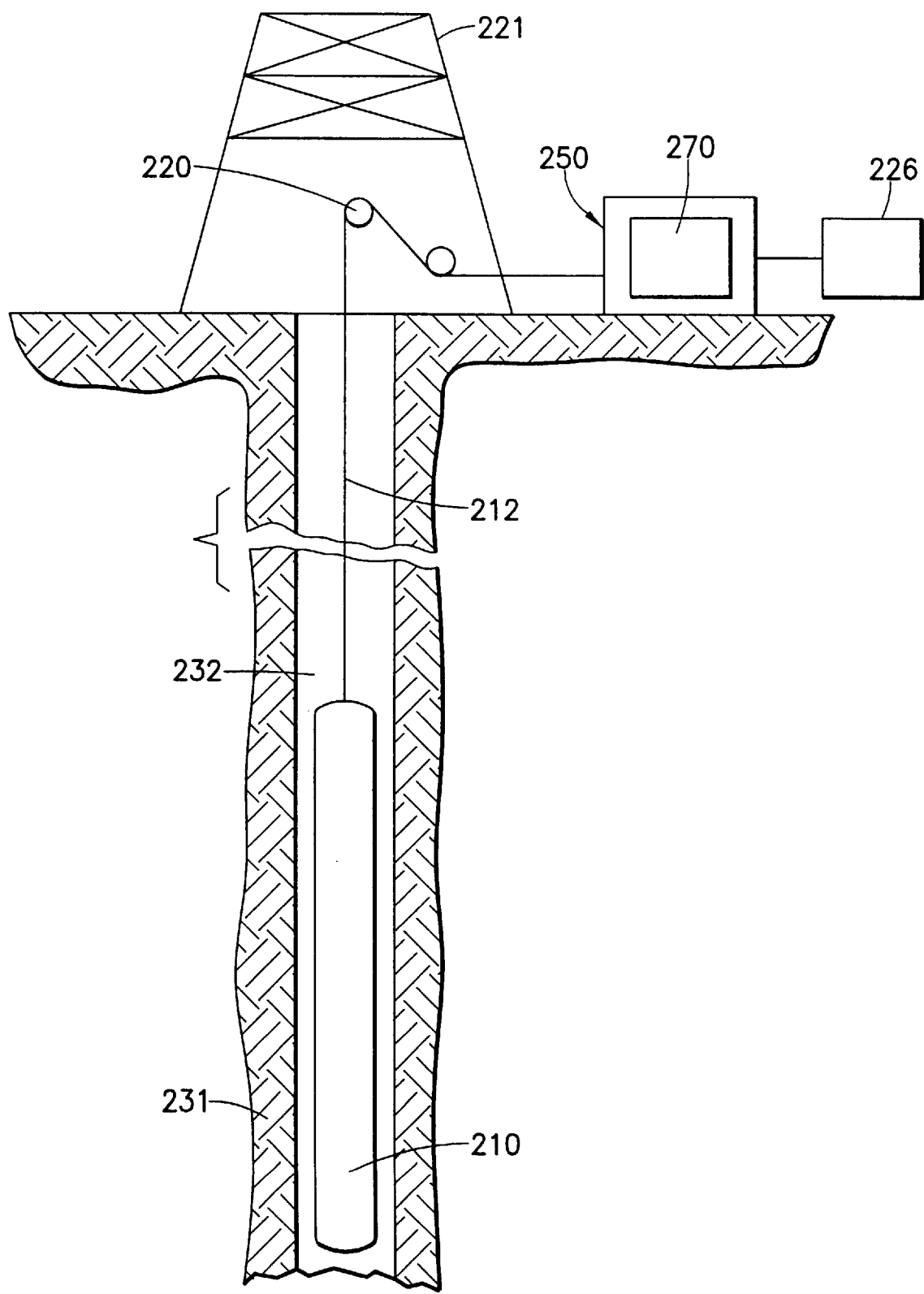
FIG. 1 is a diagram, partially in block form, of a type of apparatus that can be used in practicing embodiments hereof.

Referring to FIG. 1, there is shown a type of apparatus which can be used in practicing embodiments of the invention. Subsurface formations 231 are traversed by a borehole 232 which is typically, although not necessarily, filled with drilling fluid or mud. A logging tool 210 is suspended on an armored cable 212 and may have optional centralizers (not shown). The cable 212 extends up the borehole, over a sheave wheel 220 on a derrick 221 to a winch forming part of surface equipment 250. Known depth gauging apparatus (not shown) is provided to measure cable displacement over the sheave wheel 220 and accordingly the depth of the logging tool 210 in the borehole 232. A device of a type well known in the art is included in the tool 210 to produce a signal indicative of orientation of the body of the tool 210. Processing and interface circuitry within the tool 210 amplifies, samples and digitizes the tool's information signals for transmission and communicates them to the surface equipment 250 via the cable 212. Electrical power and control signals for coordinating operation of the tool 210 are generated by the surface equipment 250 and communicated via the cable 212 to circuitry provided within the tool 210. The surface equipment includes processor subsystem 270 (which can typically include a microprocessor, memory, clock and timing, and input/output functions—not separately shown), standard peripheral equipment (not separately shown), and recorder 226.

Figure 2:
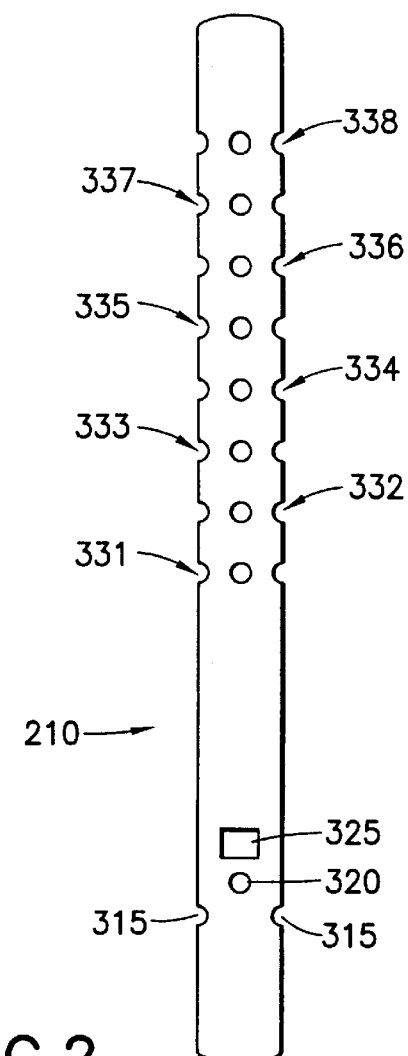
FIG. 2 is a simplified diagram of a type of downhole logging device that can be used in practicing embodiments hereof.
Figure 3:
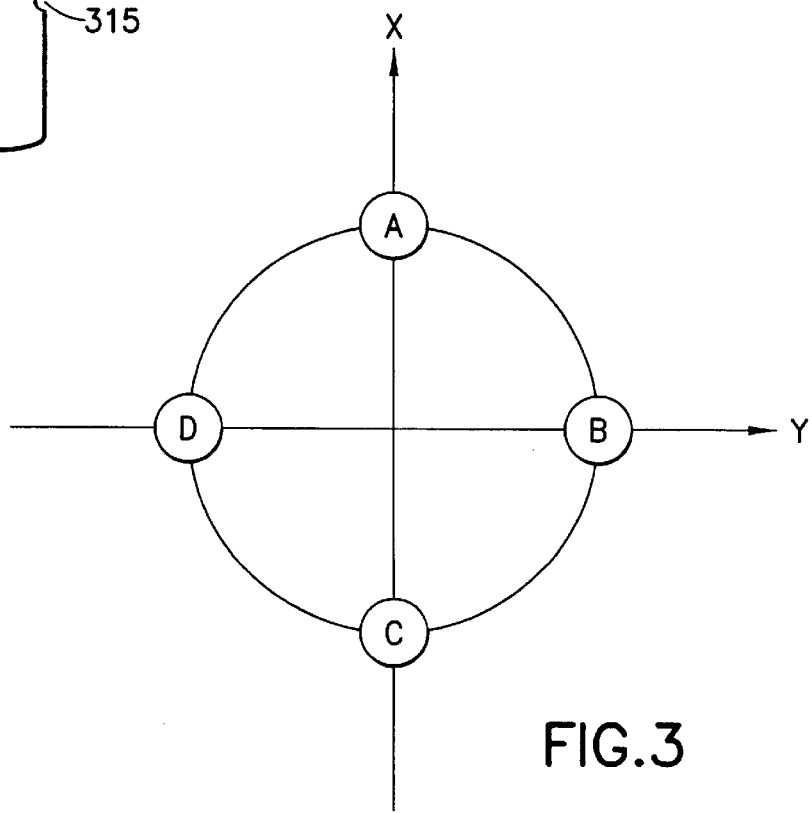
FIG. 3 is a diagram illustrating, in cross-section, the placement of hydrophones that can be used at a receiver station in the logging device of FIG. 3.

The logging device 210 may be, for example, of a type known as a Dipole Shear Sonic Imager ("DSI"—trademark of Schlumberger) generally described in Harrison et al., "Acquisition and Analysis of Sonic Waveforms From a Borehole Monopole and Dipole Source for the Determination of Compressional and Shear Speeds and Their Relation to Rock Mechanical Properties and Surface Seismic Data", Society of Petroleum Engineers, SPE 20557, 1990. It will be understood, however, that any suitable logging device can be utilized. Further details of the logging device 210 of this example are shown in FIG. 2. The logging device 210 includes crossed dipole transmitters 315 and 320 (only one end of dipole 320 being visible) and a monopole transmitter 325, so that waves including compressional, shear, Stoneley, and flexural can be excited. Eight, or other suitable number, of spaced apart receiver stations, designated 331 through 338 each comprise four receiver hydrophones mounted azimuthally at ninety degree intervals in the surface of the cylindrical logging device. FIG. 3 shows the hydrophones, designated A, B, C, and D. In an example shown in FIG. 4, an X component can be obtained by subtracting the signals received at A and C (i.e., A-C), and a Y component can be obtained by subtracting the signals received at B and D (i.e., B-D). With four receiver elements at each receiver station, there are a total of thirty two receiver elements in this example. The receiver stations are also configurable for monopole reception.

The transmitter electronics contain a power amplifier and switching circuitry capable of driving the two crossed-dipole transmitter elements and the monopole element from a programmable waveform. Separate waveforms with appropriate shape and frequency content can be used for dipole, Stoneley and compressional measurements. The receiver electronics processes the signals from the 32 individual receiver elements located at the eight receiver stations which are spaced six inches apart. At each station, four receivers are mounted as shown in FIG. 3 which allows measurement of the dipole and crossed-dipole waveforms by differencing the outputs from opposite receivers, as previously described. Summing the outputs of the receivers can be used to produce a monopole equivalent signal. As further described in Harrison et al., supra, the receiver electronics multiplexers, filters, amplifies and channels the signals from the 32 receiver elements to 8 parallel signal paths. These eight parallel analog signals are passed to an acquisition electronics cartridge where eight 12-bit analog-to-digital converters digitize the signals from the receiver electronics. The telemetry circuitry passes the digitized information to the earth's surface.

Figure 4:
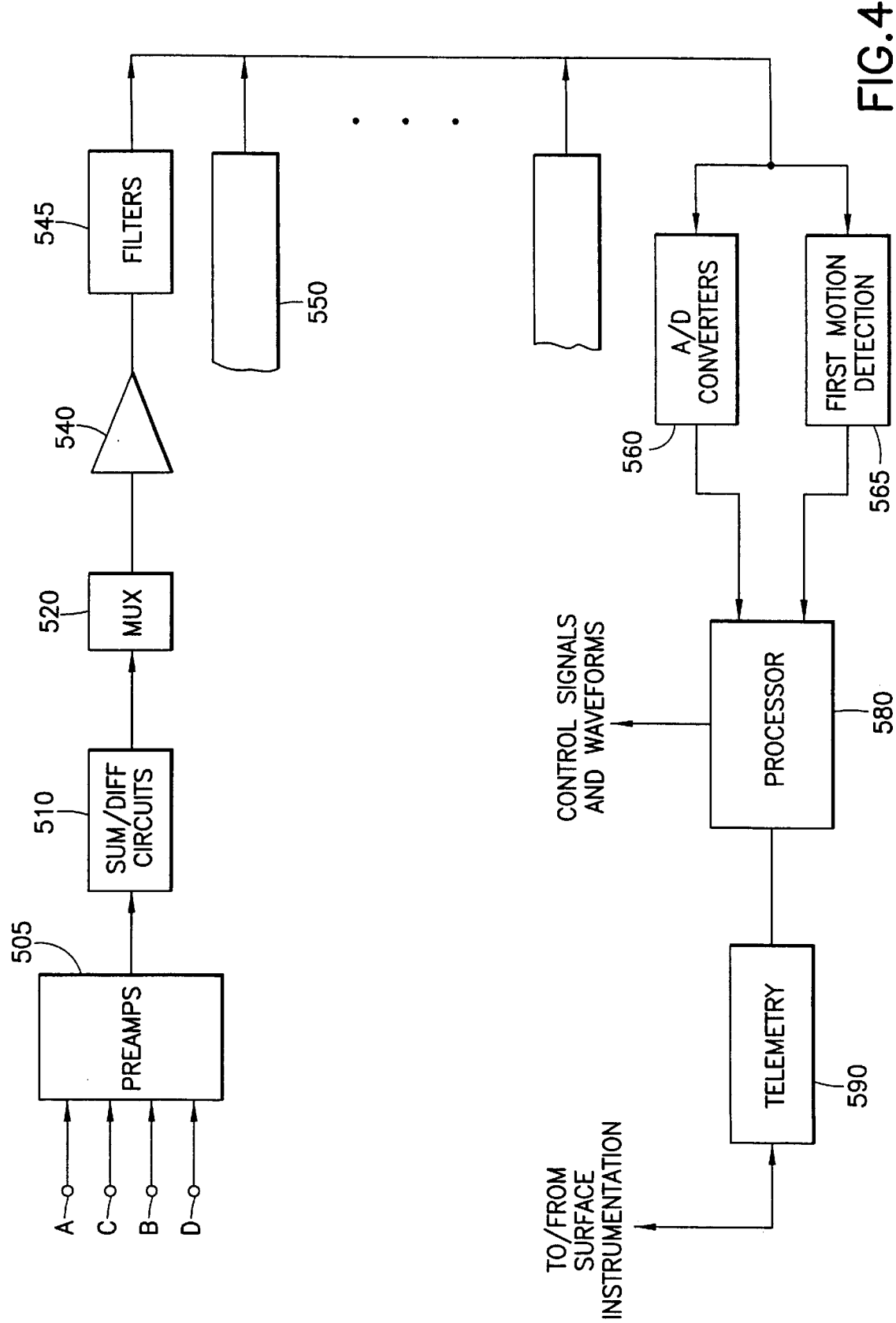
FIG. 4 is a block diagram of a portion of the electronics of the FIG. 2 logging device.

FIG. 4 shows an example of the acquisition signal path in block diagram form for one of the eight (or other suitable number of) receiver stations, as described in Harrison et al., supra. Each receiver has its own charge preamplifier (represented at 505). The output of the receivers, odd numbered pairs being in-line with the upper dipole transmitter and even numbered pairs with the lower dipole transmitter, passes into both a summing circuit (for monopole measurements) and a differencing circuit (for dipole measurements), as represented at 510. Under software control the sum or difference is selected by a multiplexer stage (block 520) and the signal passed to one of eight programmable gain amplifier stages (540) and filters (545). The other similar channels are represented by block 550. The eight parallel analog signals are passed to eight parallel 12-bit A/D converters (represented at 560) where simultaneous waveform digitization is performed. If desired, more bits can, of course, be used to advantage. After digitization, the eight waveforms pass to the memory section associated with downhole processor 580. The processor also provides control signals and waveforms to transmitter and receiver electronics. An alternate path directs the eight analog receiver signals into threshold crossing detection circuitry or digital first motion detection, as represented at block 565. This circuitry detects the time of all up or down going threshold crossings. The digitized waveform data and the threshold crossing time data are passed to the surface using telemetry circuitry 590. It will be understood that more advanced tool implementations, having further transmitters, receivers, and/or transmitter-to-receiver (T/R) spacings, and more powerful processing capabilities, can be used even more advantageously, consistent with the principles hereof, in practicing embodiments of the invention.

In the FIG. 2 embodiment, the processing of signals recorded uphole can be implemented using a processor 270, such as a suitably programmed general purpose digital processor with memory and peripherals conventionally provided. It will be understood, however, that the processing need not be performed at the wellsite, and that signals derived at the wellsite can be processed at a remote location. It will also be understood that other suitable logging tools can be employed in practicing the invention.

The traditional sonic log presents compressional slowness, $\Delta t_c$, and shear slowness, $\Delta t_s$, and Stoneley slowness, $\Delta t_{sr}$, as a function of depth, z. This description has usually been based on the idea that rock can be described as a homogeneous and isotropic material where the compressional and shear velocities, Vc and Vs, of the formation are only a function of depth. It has become recognized however, that this is not a complete characterization of the formation. Formations may be anisotropic where the compressional and shear slownesses are a function of azimuth, θ. Anisotropy can occur because of layered shales, aligned fractures or differences in the magnitudes of the principal stresses. Formations may also be inhomogeneous where the slownesses become a function of radial distance from the borehole, r. Inhomogeneity can be caused, for example, by mud-shale interactions or by mechanical damage due to stress concentrations.

Figure 5:
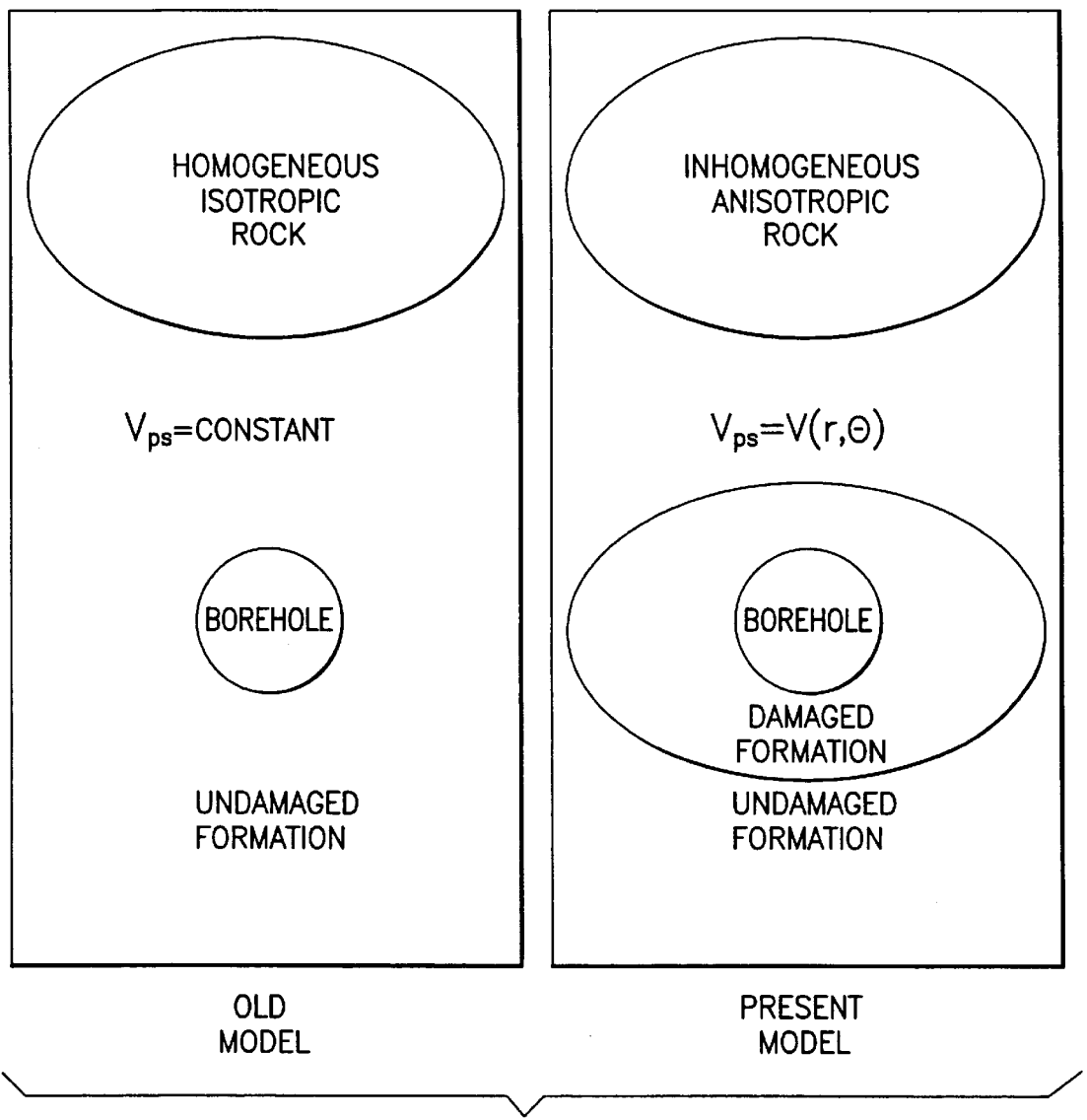
FIG. 5 is a conceptual diagram showing, on the left, a traditional model used in sonic characterization of formations and, on the right, a more general model used in a form of hereof.

A form hereof addresses the compressional and shear velocity around a borehole, Vc,s(r,θ), at a single depth and a processing chain to exploit the model. Conceptually, a model of velocity around a borehole model is shown in FIG. 5. The velocities Vc,s(r,θ) associated with the model are described as only a function of radius and azimuth. A typical old model, shown on the left, depicts a homogeneous and isotropic formation with Vc,s(r,θ)=constant. In the old model, the rock around the borehole is assumed to be the same as if no borehole was ever drilled through the rock. The model hereof, on the right, assumes that the drilling process and related stress concentrations and/or mud system may have damaged or altered the rock from its pre-drilled state. At this stage, consider the general case where the altered, changed or damaged rock (see Plona, T. J., Sinha, B. K., Winkler, K. W, and D'Angelo, R., "Measurement of Stress Direction and Mechanical Damage Around Stressed Boreholes Using Dipole and Microsonic Techniques", SPE 47234 presented at Eurock '98 (1998)) can have an elliptical region around the borehole that has been perturbed. The elliptical region implies that the formation can be both anisotropic and inhomogeneous, i.e., Vc,s=V(r,θ).

With the rock around the borehole modeled to have both radial and azimuthal variations of sound speeds, an embodiment hereof uses both monopole and dipole data from a sonic tool or tools, processed jointly, to yield a more complete characterization of the formation acoustic properties. Historically, sonic logging has evaluated compressional and shear data independently. In a form of the present invention, compressional and shear data are processed in a joint manner in order to get a more complete characterization of the formation. Inputs to this characterization are the monopole compressional slowness and the dipole shear slowness.

For the monopole input, in this form of the invention, monopole compressional data is obtained at both relatively short transmitter/receiver (T/R) spacings (for example, 3 to 5 ft.) and relatively long T/R spacings (for example, 8 to 12 ft.). The data can be obtained using any suitable technique, for example with the type of equipment described in conjunction with FIGS. 1–4. Reference can be made, for example, to the data obtained in Hornby, B. E. "Tomographic Reconstruction of Near-Borehole Slowness Using Refracted Borehole Sonic Arrivals", Geophysics, 58, 1726–1738, (1993).

Figure 6A:
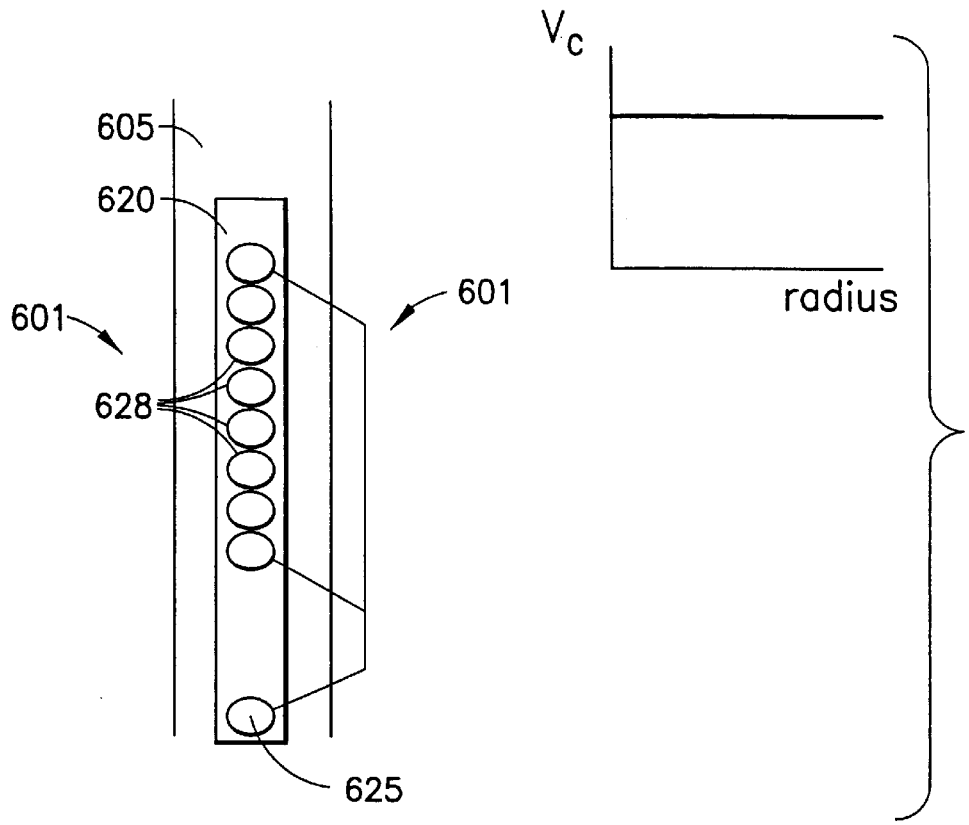
FIGS. 6A and 6B, show simplified sonic logging device representations, with a source and receivers, and illustrate ray paths from a monopole source in a homogeneous formation (FIG. 6A) and in an inhomogeneous formation (FIG. 6B).
Figure 6B:
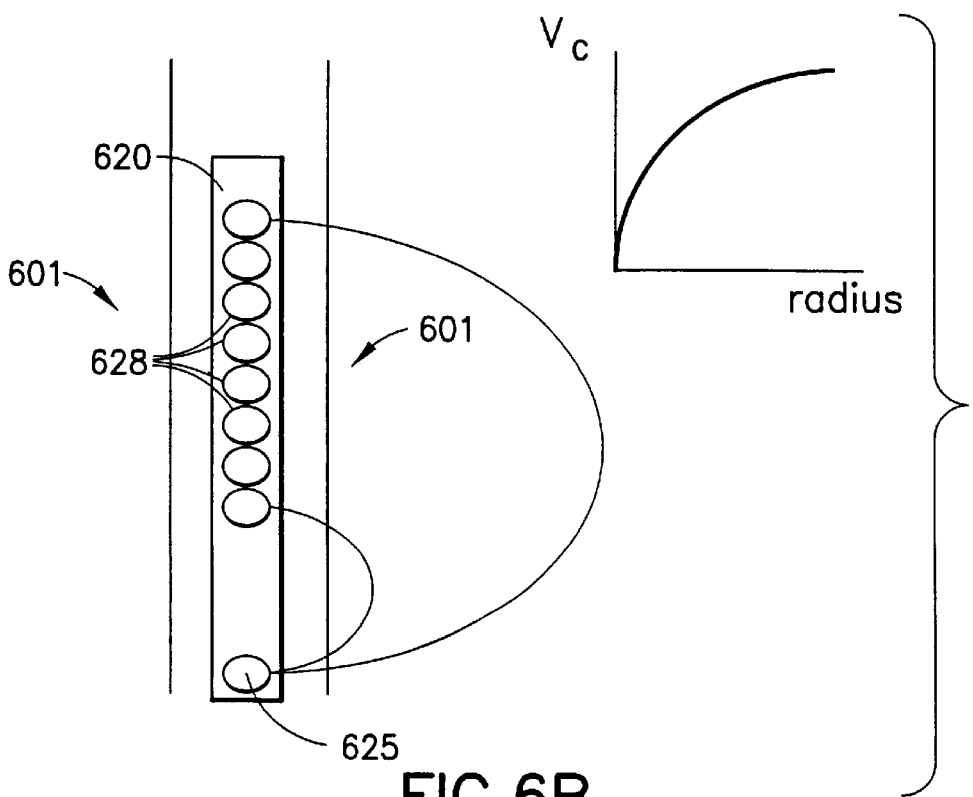

In the simplified diagrams of FIGS. 6A and 6B, formation is represented at 601, a borehole is represented at 605, a logging device is represented at 620, a monopole source is represented at 625, and receivers are represented at 628.

In FIG. 6A the sound rays are shown as propagating from the monopole source to the receivers in straight lines. The small graph inset indicates that the sound speed is substantially constant with radius. This is the traditional concept of monopole sonic logging where the assumption is generally that the formation is homogeneous. However, when there is a gradient of sound speed vs radius (i.e., inhomogeneity), it is known that sound propagates in curved ray paths. For the case indicated in FIG. 6B, where the sound speed increases vs radius from the borehole, the ray paths are curved such that energy returns to the borehole. In this case, the ray path that arrives at the nearest receiver senses a velocity that is indicative of the formation near the wellbore (that is, a shallow depth of investigation). In contrast, the ray path that arrives at the farthest receiver senses a velocity which in indicative of the formation relatively far away from the borehole (i.e., a relatively deep depth of investigation, not substantially affected or perturbed by the borehole). Thus, the measured velocity depends on the T/R spacing. The difference in the slowness measurement at short and long T/R spacings provides an indication of formation inhomogeneity.

Figure 7:
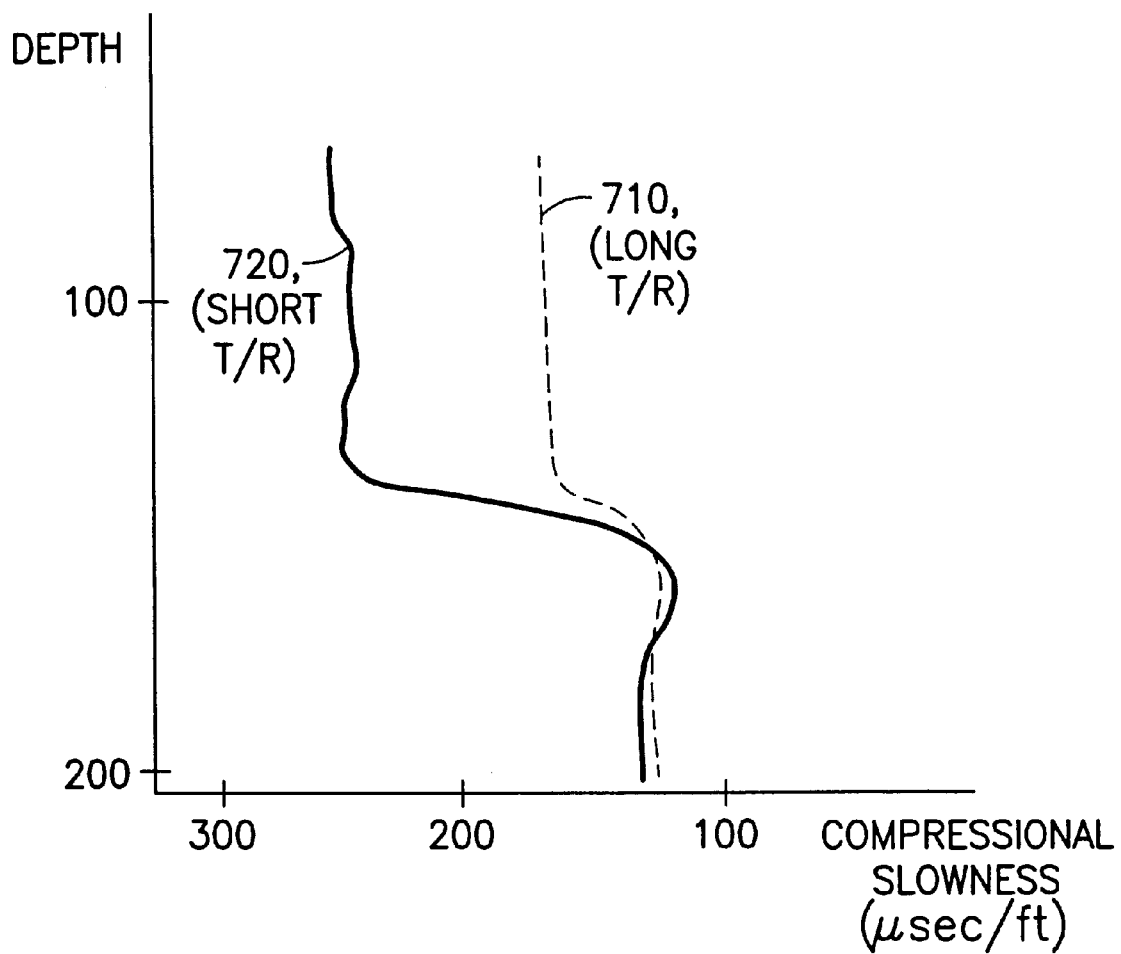
FIG. 7 illustrates a portion of a log of compressional slowness at relatively long and relatively short transmitter-to-receiver spacings.

Consider the example of logs of slowness data as in FIG. 7. The track 710 represents the slowness at the long T/R spacing and is generally indicative of the unperturbed or undamaged rock. The track 720 represents the slowness at the short T/R spacing and is characteristically a higher slowness (i.e. lower velocity). The difference in the two curves, at depth levels between about 100 and 150 ft. in this example, indicates radial variations of velocity (i.e., inhomogeneity).

Figure 8:
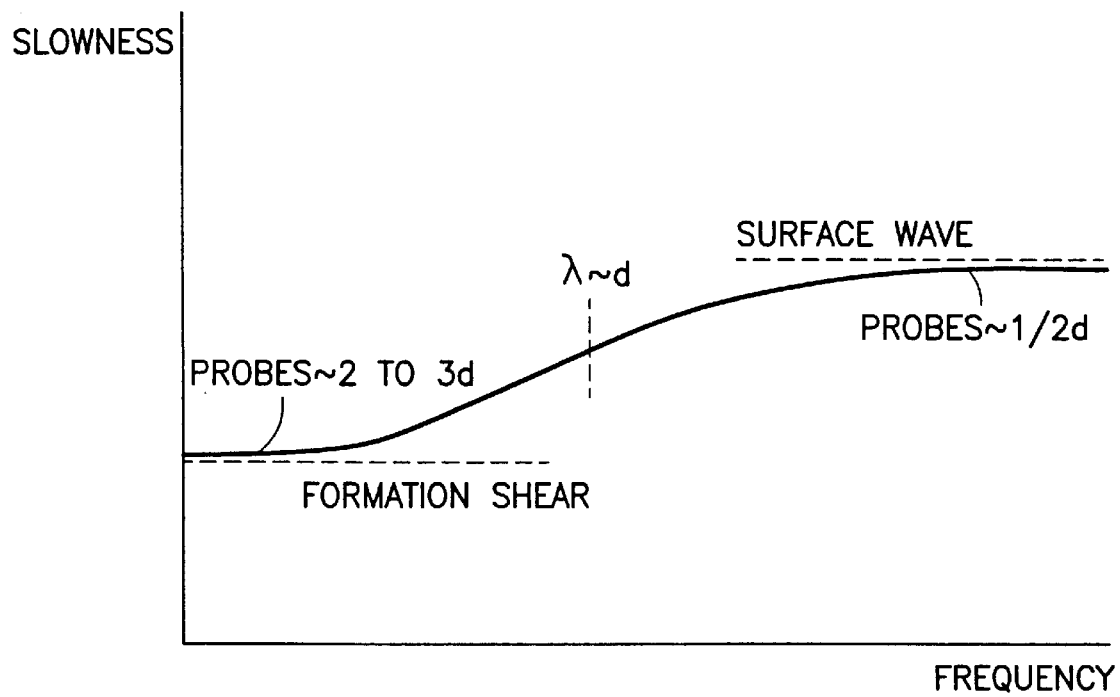
FIG. 8 shows a dipole dispersion curve of slowness as a function of frequency.

For the dipole shear measurements, the data is acquired in the crossed dipole mode, and the data can be used to determine the isotropy or anisotropy of the formation. The four-component rotation method of Alford can be used. (See Alford, R. M., 1986, "Shear Data In the Presence Of Azimuthal Anisotropy": 56th Ann. Internat., Soc. Expl. Geophys., Expanded Abstracts, 476–479)). Slowness is evaluated as a function of frequency (i.e., the dispersion curve.) In FIG. 8, a basic dipole flexural mode dispersion curve is shown, where "d" refers to the diameter of the borehole. There are several points to observe from this Figure. First, the dispersion curve approaches the formation shear slowness at low frequencies. Second, at low frequencies (and long wavelength) the dipole signal is sensing 2 to 3 borehole diameters into the formation. Third, at high frequencies (and short wavelengths), the dipole signal is sensing approximately ½ the borehole diameter into the formation. Thus, the information at different frequencies is sensing sound speeds at different depths of investigation. (See Sinha, B. K., Norris, A. N., and Chang, S. K., 1994, "Borehole Flexural Modes In Anisotropic Formations": Geophysics, 59, 1037–1052.)

Figure 9A:
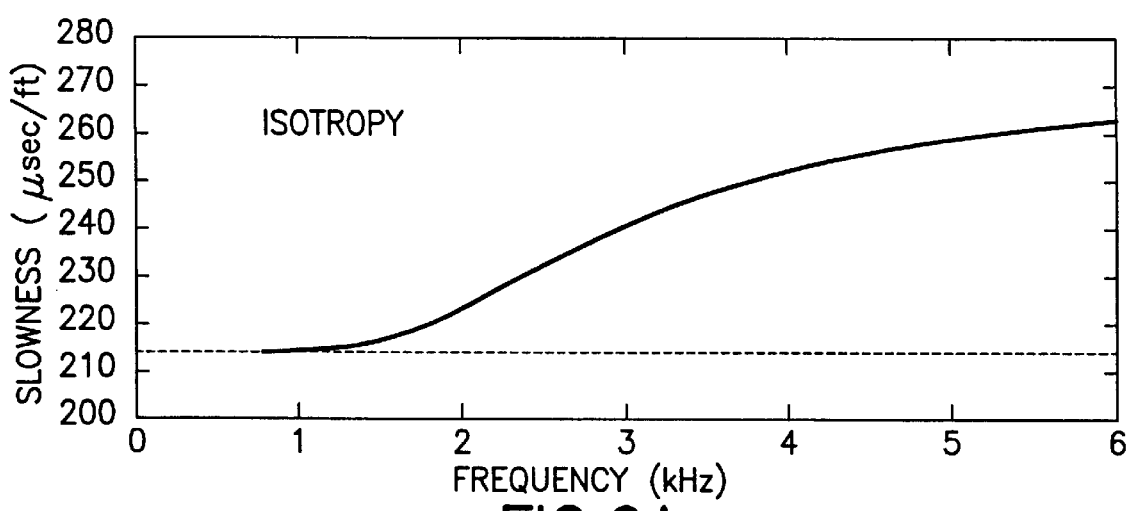
FIGS. 9A, 9B, and 9C, shows dipole dispersion curves for situations of formation isotropy (FIG. 9A), formation intrinsic anisotropy (FIG. 9B), and formation stress-induced anisotropy (FIG. 9C).
Figure 9B:
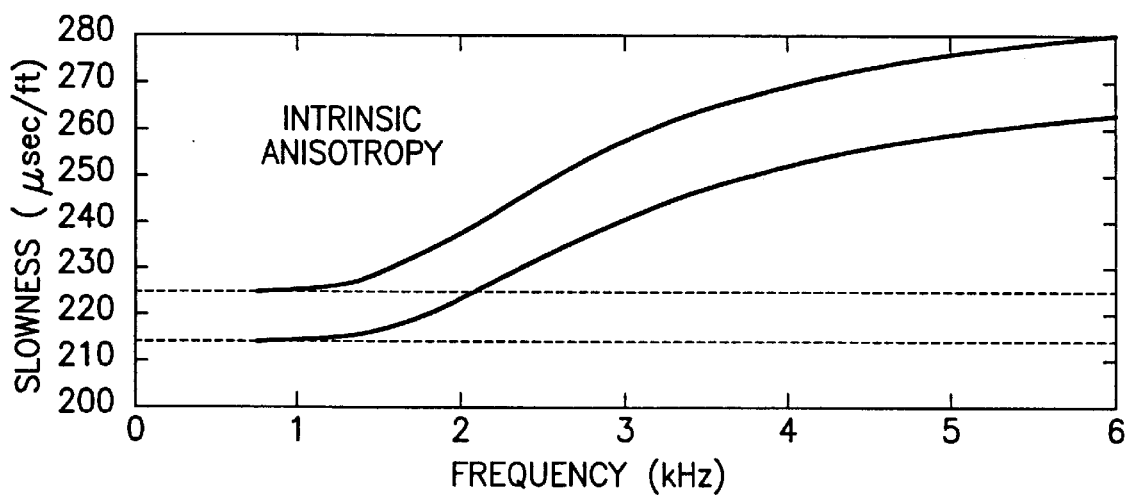
Figure 9C:
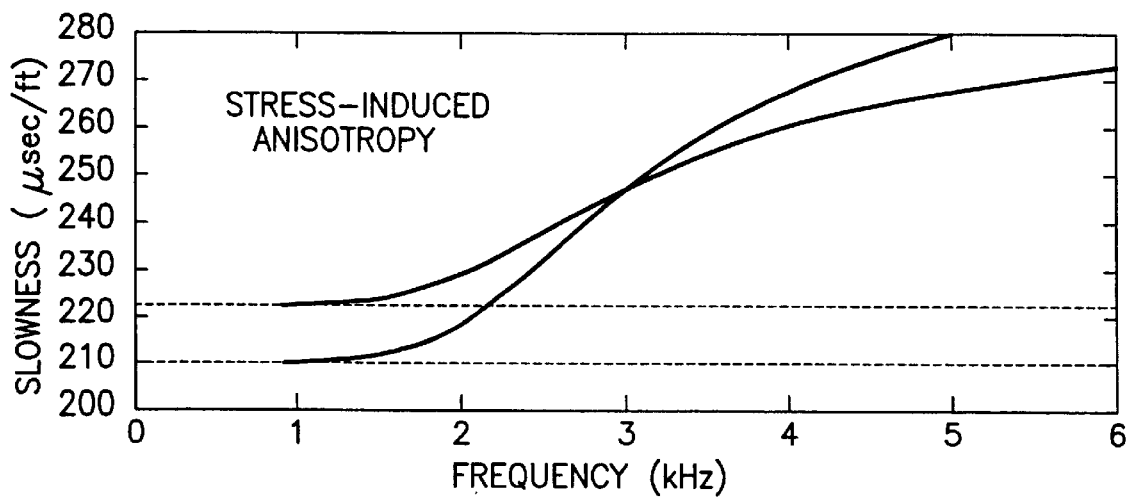

In FIG. 9, which includes graphs 9A, 9B and 9C, it is shown how the dispersion curves indicate the isotropy or anisotropy of the formation. In the plot 9A, there is only one dispersion curve visible. This is because the two curves from the respectively orthogonal dipole pairs (see e.g. FIG. 3) substantially overlap. This is the case when the formation is isotropic. The dispersion curve approaches the shear speed (dashed line) at low frequencies. In the plots 9B and 9C there are two dispersion curves, and this indicates that the formation is anisotropic. The plot 9B shows the case when the formation anisotropy is "intrinsic" and the two dispersion curves do not cross. (See Sinha, B. K., Norris, A. N., and Chang, S. K., 1994, supra.) The plot 9C shows the case when there is stress-induced anisotropy and the two dispersion curves cross. (See Sinha, B. K., and Kostek, S., 1996, "Stress Induced Azimuthal Anisotropy In Borehole Flexural Waves": Geophysics, 61, no. 6, 1899–1907.) The crossing nature of the stress-induced anisotropy dispersion curves is a feature that permits a discrimination to be made between the two types of anisotropy. These stress-induced anisotropy effects have been observed in field data. (Sinha B. K., Kane, M., and Frignet, B., "Dipole Dispersion Crossover And Sonic Logs In Limestone Reservoirs", Geophysics, 65, No. 2 (March–April 2000), pp. 390–407).

Figure 10:
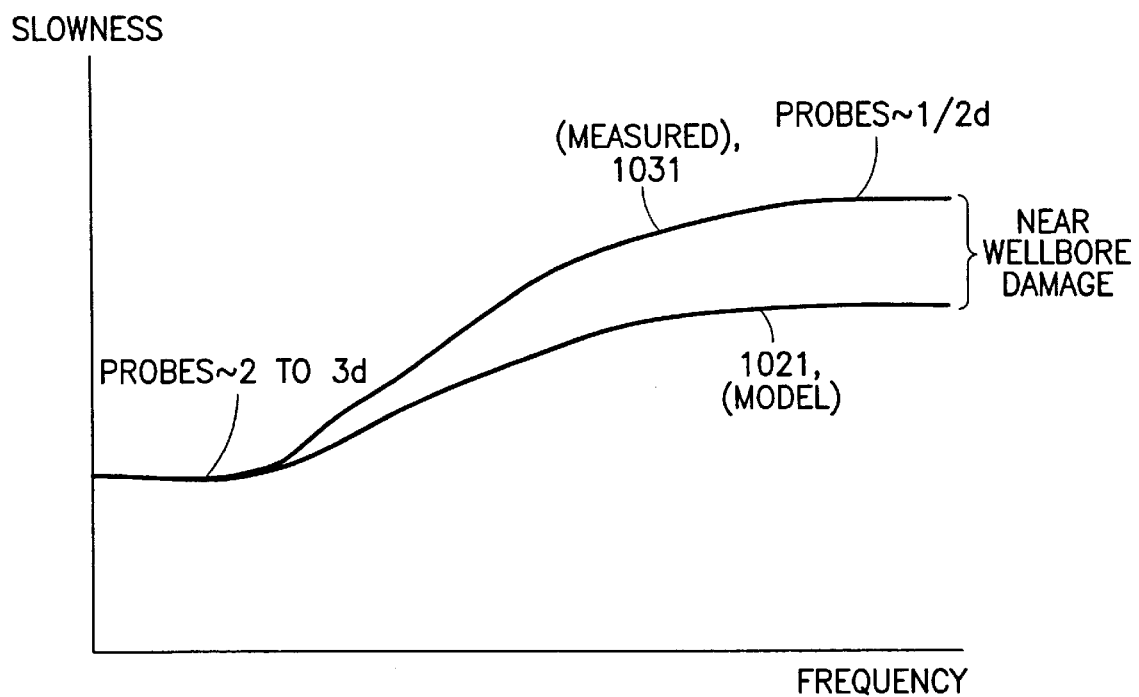
FIG. 10 shows dipole dispersion curves for a model formation and for measured data, respectively, and illustrates a situation of near wellbore damage.

In addition to the distinction between isotropy and anisotropy, dispersion curves can also yield an indication of homogeneity/inhomogeneity. This is illustrated in conjunction with FIG. 10. In this Figure, the model data is represented at curve 1021 and the measured data is represented at 1031. The model data can be produced, for example, from measured compressional and shear velocities, formation mass density, mud density, mud compressional velocity, and borehole diameter (see Sinha, B. K., Norris, A. N., Norris, A. N., and Chang, S. K., 1994, Borehole Flexural Modes In Anisotropic Formations, Geophysics, 59, 1037–1052). If the measured data superimposes with the model data, it can be concluded that the formation is homogeneous. When the measured data deviates at high frequency (as in the Figure), it can be concluded that the formation is inhomogeneous. Since the deviation occurs at high frequency that corresponds to probing near to the borehole, this deviation indicates that there is lower sound speed near the borehole wall, i.e., inhomogeneity or damage.

With the basic realization that the rock around the borehole may have both radial and azimuthal variations of sound speeds, both monopole and dipole data from sonic tools can be utilized to give a more complete characterization of the formations acoustic properties. In a preferred embodiment hereof, the sonic characterization includes four categories as follows:

Homogeneous and Isotropic

Inhomogeneous and Isotropic

Homogeneous and Anisotropic

Inhomogeneous and Anisotropic

In the present embodiment, monopole compressional slownesses and dipole shear slownesses are used in determining the appropriate characterizations. From the monopole compressional data, a determination is made as to whether or not the compressional slowness is a function of transmitter-to-receiver (T/R) spacing. If the compressional slowness is not a function of T/R spacing, then the formation is deemed homogeneous. If the compressional slowness is a function of T/R spacing, particularly, if the slowness decreases with increasing T/R spacing, the formation is deemed to be inhomogeneous. [Reference can also be made to the technique described in conjunction with FIGS. 18–22.] From the crossed dipole shear data, it can be determined if the formation is isotropic (one shear slowness) or anisotropic (two shear slownesses). In addition, inhomogeneity can be determined from the deviation of the measured dispersion curve from the modeled curve. With these determinations, an acoustic description of the formation can be given as one of the above-listed characterizations: homogeneous/isotropic; inhomogeneous/isotropic; homogeneous/anisotropic; or inhomogeneous/anisotropic.

The following set of Figures, FIGS. 11–14, show examples of types of sonic field data that highlight homogeneity/inhomogeneity and/or isotropy/anisotropy in formations. The monopole data of these examples is extracted from the idealized data of FIG. 3. (See Hornby, supra.) The dipole data is field data from the sonic logging tool described in conjunction with FIGS. 2–4. Although in these examples the monopole and dipole data have been derived from different wells, the data has been combined in this set of examples to illustrate the principle hereof. It will be understood that, in practice, the measurements can be taken by a single tool (or, less preferably, plural tools in a single logging run, or plural logging runs).

Figure 11A:
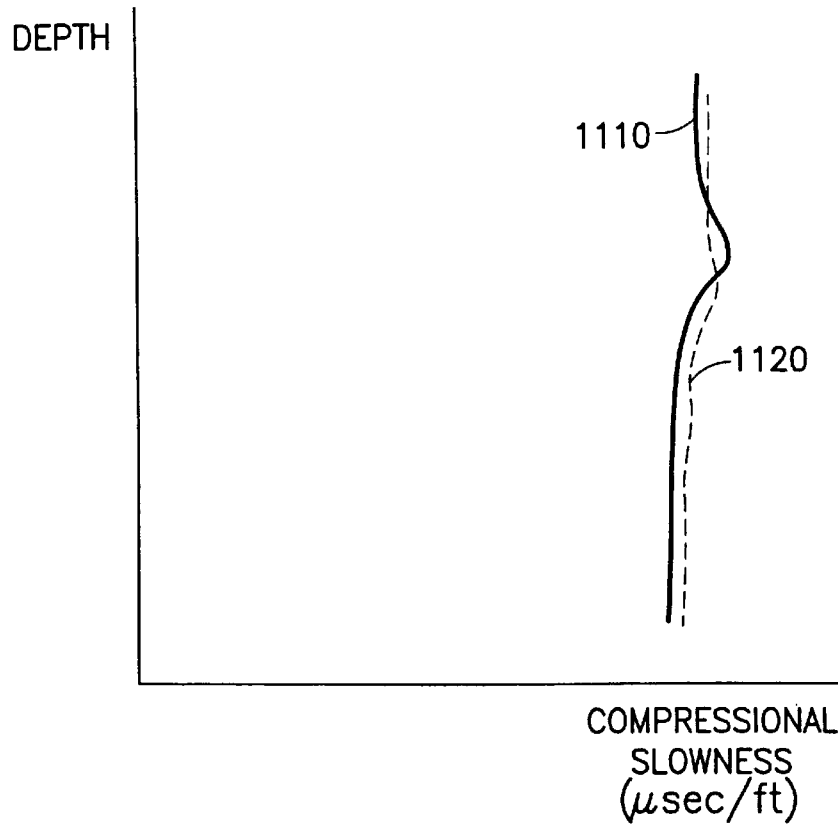
FIG. 11A and FIG. 11B, shows, in FIG. 11A, monopole compressional slowness as a function of depth for relatively short and relatively long transmitter-to-receiver spacings for a case of a homogeneous and isotropic formation, and, in FIG. 11B, dipole dispersion curves and a model dipole dispersion curve of slowness as a function of frequency for the case of a homogeneous and isotropic formation.
Figure 11B:
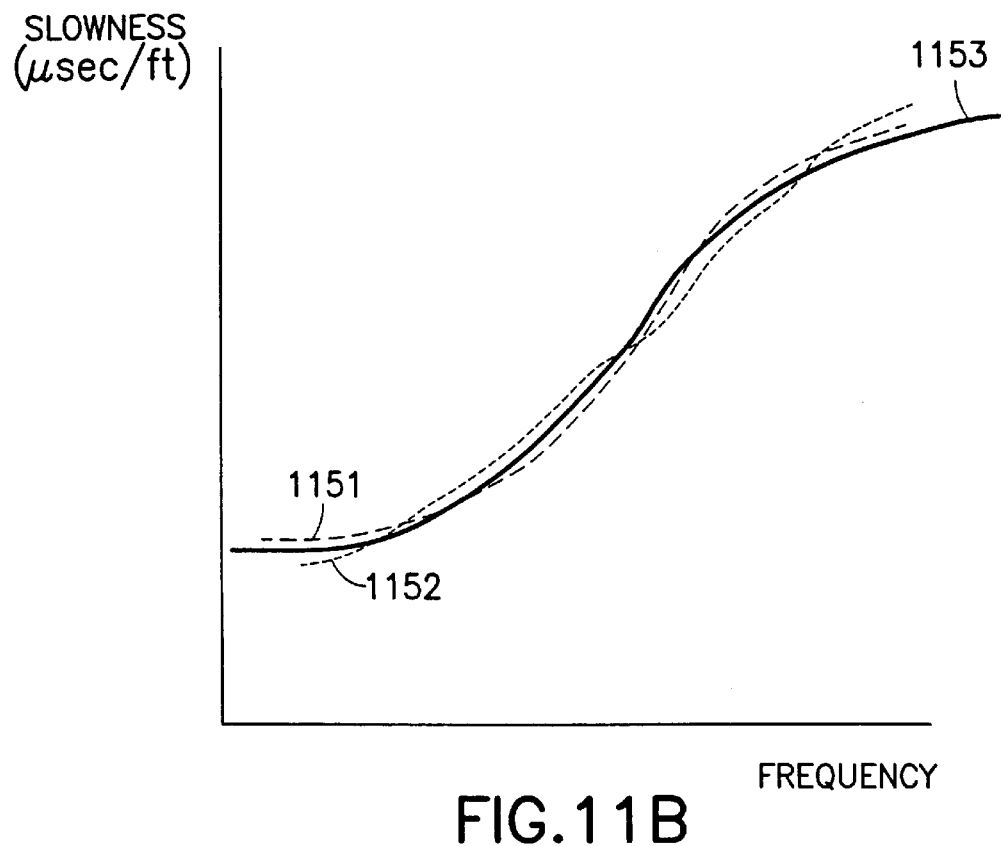

FIGS. 11A and 11B illustrate the homogeneous and isotropic case. From the monopole data of FIG. 11A, it is seen that the compressional slowness from the short T/R measurement (the log 1110) substantially corresponds to the slowness from the long T/R measurement (the log 1120). This is one indication of homogeneity. From the dipole data of FIG. 11B, two things can be observed. First, the curves 1151, 1152 (measured data) are from the crossed dipole acquisition from orthogonal transmitters/receivers. Since the two dispersion curves lie substantially on top of each other, an isotropic formation is indicated. Secondly, the measured data is similar to the modeled dispersion curve (1153). The model curve is for the homogeneous case. The measured data fitting the model is a second indicator that the formation is homogeneous. Thus, with a joint processing of monopole and dipole data, it is determined that the formation at the depth of these measurements is both homogeneous and isotropic.

Figure 12A:
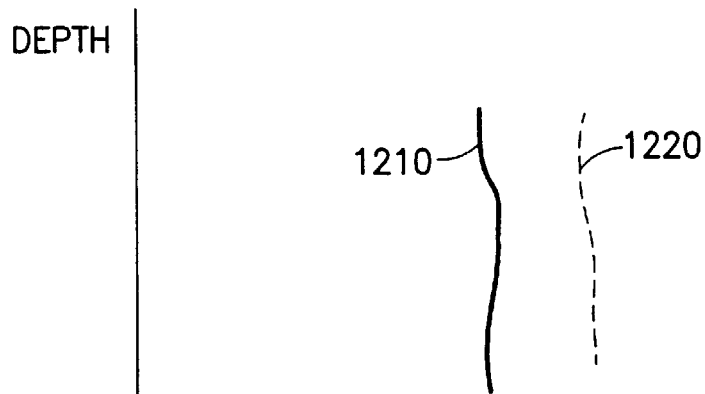
FIG. 12A and FIG. 12B, shows, in FIG. 12A, monopole compressional slowness as a function of depth for relatively short and relatively long transmitter-to-receiver spacings for a case of an inhomogeneous and isotropic formation, and, in FIG. 12B, dipole dispersion curves and a model dipole dispersion curve of slowness as a function of frequency for the case of an inhomogeneous and isotropic formation.
Figure 12B:
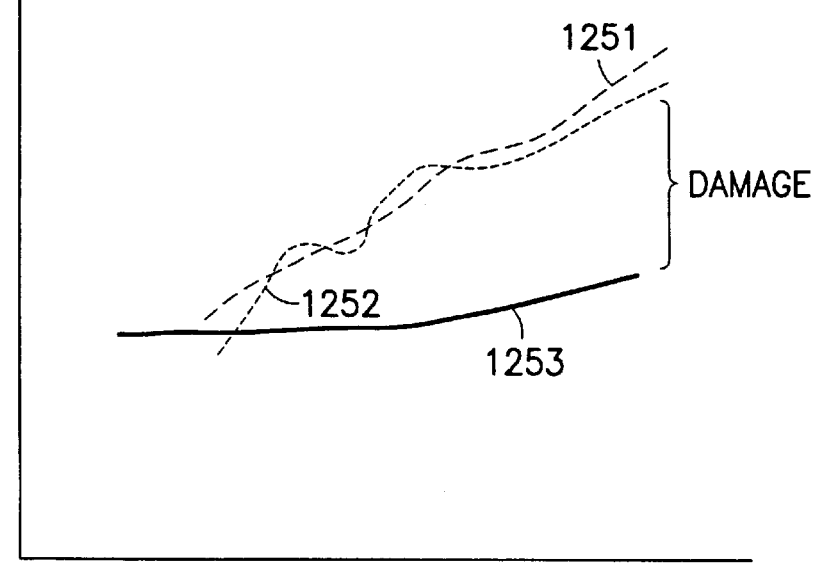

FIGS. 12A and 12B illustrate the inhomogeneous and isotropic case. From the monopole data, it can be seen that the compressional slowness from the short T/R measurement (the log 1210) does not correspond to the slowness from the long T/R measurement (the log 1220). This is one indication of inhomogeneity, as described above. From the crossed dipole data of FIG. 12B, it can be observed that the dispersion curves 1251, 1252 (measured data) lie substantially on top of each other. This indicates that the formation is isotropic. Next, a determination is made as to whether the measured dispersion curves fit the modeled dispersion curve (1253). Since, as seen, the measured data does not fit the model, there is a second indicator that the formation is inhomogeneous. Thus, with a joint processing of monopole and dipole data, it is determined that the formation at the depth of these measurements is inhomogeneous and isotropic.

Figure 13A:
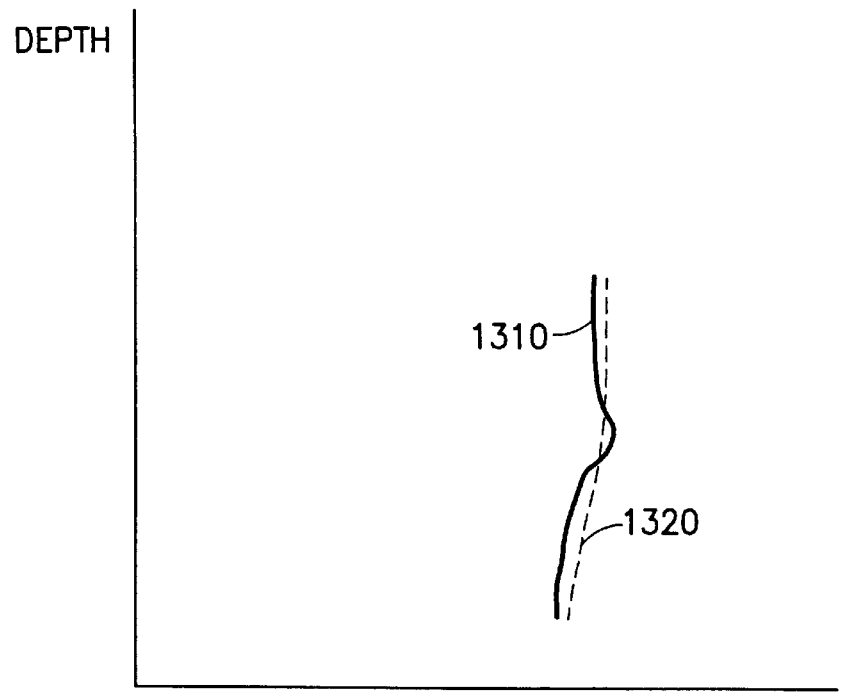
FIG. 13A and FIG. 13B, shows, in FIG. 13A, monopole compressional slowness as a function of depth for relatively short and relatively long transmitter-to-receiver spacings for a case of a homogeneous and anisotropic formation, and, in FIG. 13B, dipole dispersion curves and a model dipole dispersion curve of slowness as a function of frequency for the case of a homogeneous and anisotropic formation.
Figure 13B:
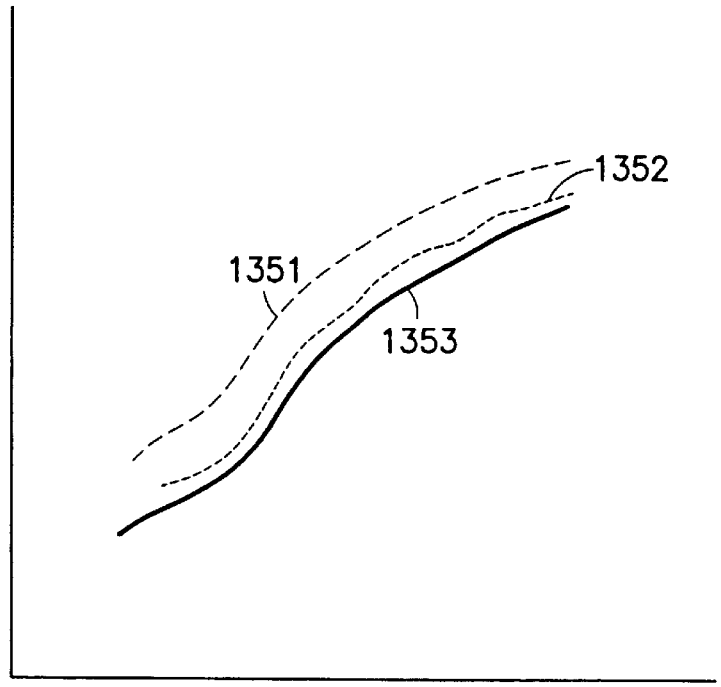

FIGS. 13A and 13B illustrate the homogeneous and anisotropic case. From the monopole data, it can be seen that the compressional slowness from the short T/R measurement (log 1310) substantially corresponds to the slowness from the long T/R measurement (log 1320). This indicates homogeneity. From the crossed dipole data, it can be observed that the dispersion curves 1351, 1352 (measured data) do not lie on top of each other. There is a characteristic difference in slowness at low frequency. This indicates that the formation is anisotropic. Next, the two measured dispersion curves are nearly parallel, or non-crossing. This indicates that this is an intrinsic anisotropic formation. Next, a determination is made as to whether the measured dispersion curves substantially fit the modeled dispersion curve (1353). Since, as seen, the measured data substantially fits the model, there is a second indicator that the formation is homogeneous. Thus, it is determined that the formation at the depth of these measurements is homogeneous and anisotropic.

Figure 14A:
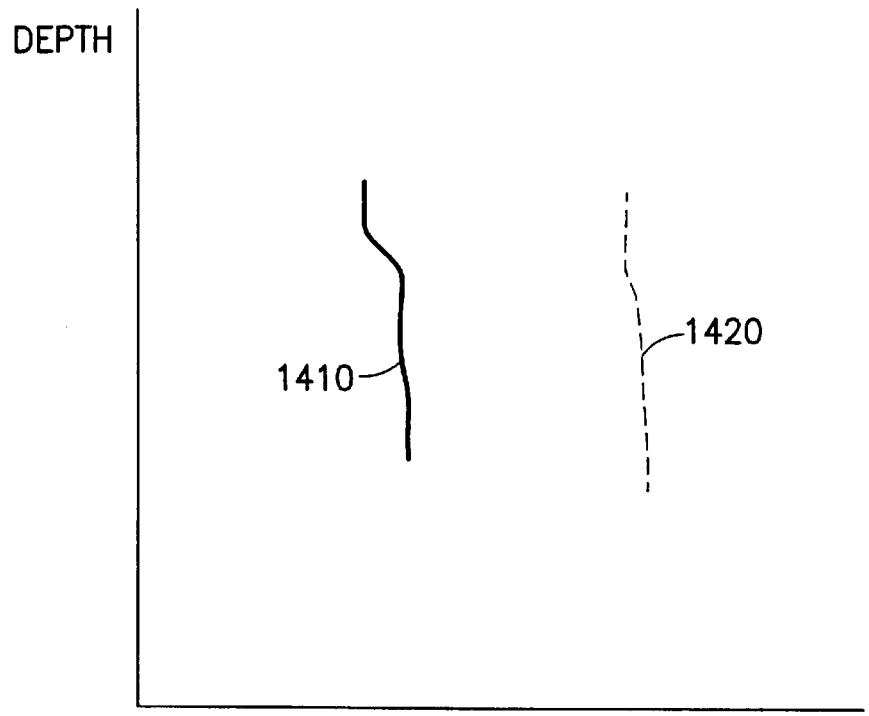
FIG. 14A and FIG. 14B, shows, in FIG. 14A, monopole compressional slowness as a function of depth for relatively short and relatively long transmitter-to-receiver spacings for a case of an inhomogeneous and anisotropic formation, and, in FIG. 14B, dipole dispersion curves and a model dipole dispersion curve of slowness as a function of frequency for the case of an inhomogeneous and anisotropic formation.
Figure 14B:
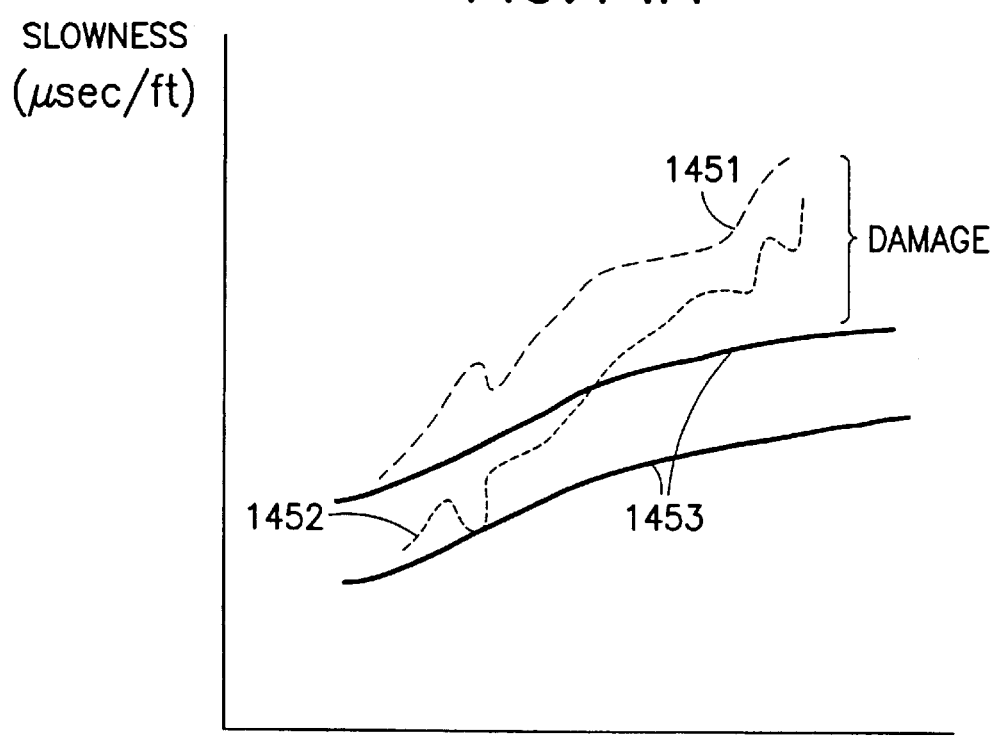

FIGS. 14A and 14B illustrate the inhomogeneous and anisotropic case. This is the most general case. From the monopole data, it can be seen that the compressional slowness from the short T/R measurement (log 1410) does not correspond to the slowness from the long T/R measurement (log 1420). This is one indication of inhomogeneity. From the crossed dipole data, it can be observed that the dispersion curves 1451, 1452 do not lie on top of each other. There is a characteristic difference in slowness at low frequency that indicates that the formation is anisotropic. In addition, the measured dispersion curves do not fit the modeled dispersion curve (1453), another indication of inhomogeneity. Thus, it is determined that the formation at the depth of these measurements is inhomogeneous and anisotropic.

In a form of the present invention, an integrated inversion of monopole, dipole and Stoneley data is performed to select a suitable rock model. After classifying the formation using one of the available rock models, the processing chain subsequently computes answer products appropriate to the selected model. In an embodiment hereof, the first stage in the processing chain is to test all of the recorded sonic data for consistency with four different models of the physics as first set forth above in the Table:

Homogeneous/Isotropic
Homogeneous/Anisotropic
Inhomogeneous/Isotropic
Inhomogeneous/Anisotropic The assumed models vary in complexity. The homogeneous isotropic model is the simplest model whose physics is well understood i.e., there is a complete theoretical understanding of sound propagation in a homogeneous isotropic formation. The inhomogeneous/isotropic and the homogeneous/anisotropic models are more complex, requiring more physical parameters for their description. For each of these models, there is not as complete an understanding of sound propagation as there is for the homogeneous isotropic case. The inhomogeneous/isotropic model is the most complex model, requiring the most physical parameters for its description, and the least well understood of the four models.

The different proposed rock models have varying complexity, and have the property that the same data might be explained equally well by different models. Sound propagation in the homogeneous/isotropic model can be viewed as a special case of sound propagation in the homogeneous/anisotropic model (or, indeed, the other two models) with certain physical parameters set to special values (e.g. the two shear speeds set to the same value). Thus, simply selecting a model based on finding the model which best fits the data may not always be a good criterion on which to base the classification. Qualitatively, a more complex model, with more degrees of freedom, can always be adjusted to fit the data better than a simpler model.

Differing model complexity also highlights a related problem. The more complex models require more physical parameters for their description, some of which cannot be easily inferred from the data. In some cases, more complex models require extremely complicated inversions, or may be severely underdetermined by the available data. An example is the inhomogeneous isotropic rock model, which is intended to address the case of radial variation of slowness away from the borehole. The inhomogeneous isotropic model is much more complicated than the homogeneous anisotropic model, as it covers a continuum of radial slowness profiles.

Figure 15:
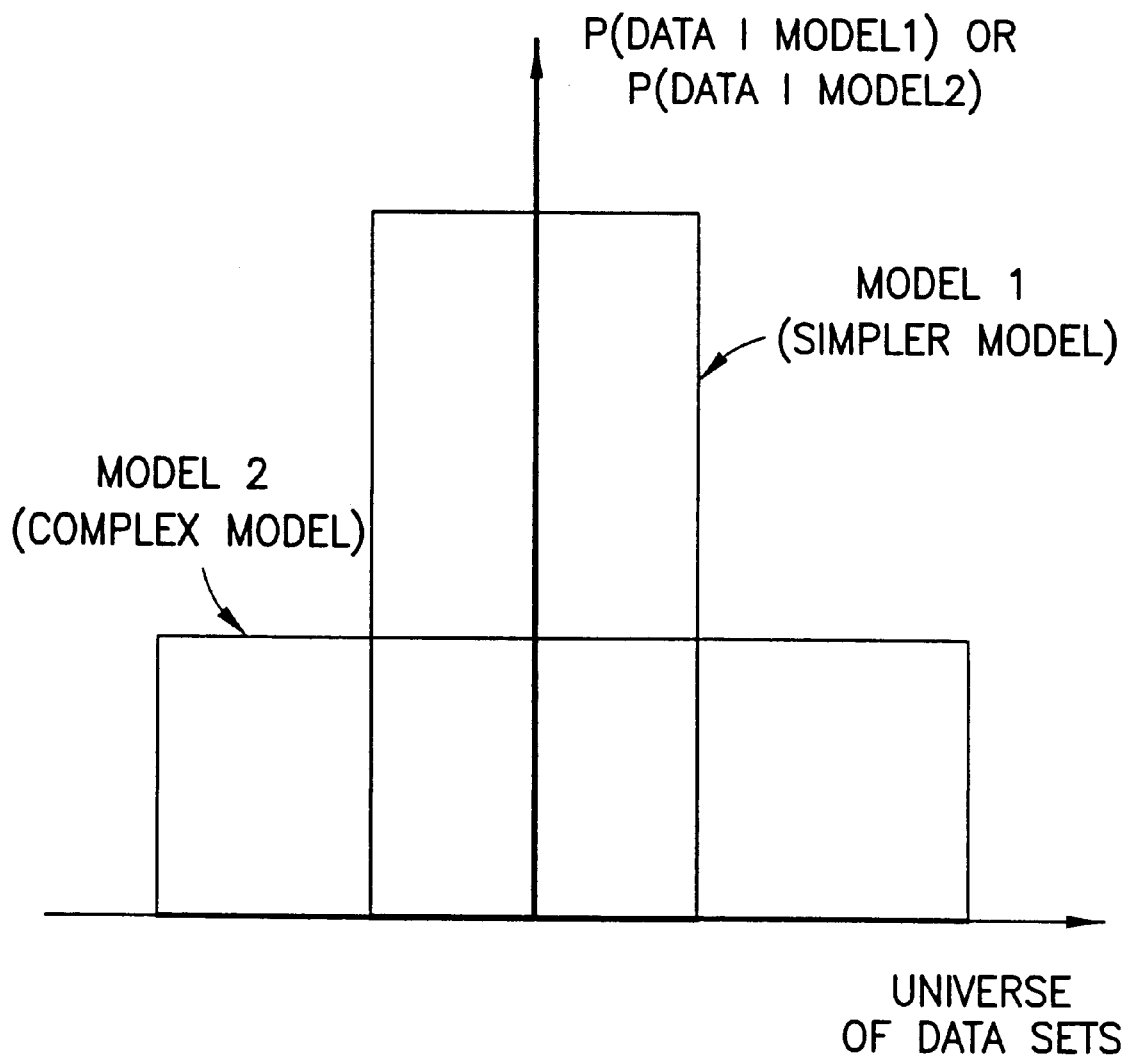
FIG. 15 shows an example of the model selection, with comparison of simple and complex models.

In a form hereof, the technique for model selection overcomes the problem of differing model complexity, and the problem of indeterminacy for more complex models. Initially, testing is performed for deviations from the homogeneous, isotropic model. This phase relies only on the complete understanding of the homogeneous isotropic model and does not require a complete theoretical description of the other three models, save that they all subsume the homogeneous isotropic model. In an embodiment hereof, the criterion used for model selection is based on computing Bayesian posterior probabilities for the four different model types. FIG. 15 illustrates the qualitative basis of this procedure. A simple model, with a few parameters, describes a smaller family of possible datasets than a more complex model with more parameters. If the horizontal axis describes the universe of possible datasets, then the simpler Model 1 in FIG. 15 describes a smaller subset of datasets compared with the more complex Model 2. Notice that there can be an overlap; that is, certain sets of data can be described by both Models 1 and 2. If one assumes a priori uniform probability density distributions are imposed for datasets described by both models, then it follows that on the region of overlap, the simpler Model is, a priori, the more probable one.

This forms the basis of the model selection procedure of the present embodiment. The data is tested for goodness of fit between a simpler model and a more complex model, which subsumes the simple model. The more complex model is selected not simply if it fits the data better than the simple model; it is only selected if the goodness of fit is sufficiently better to warrant using the added complexity of the more complex model. In this embodiment, two specific statistical tests are applied to select one of the four models. First, there is a test for homogeneity versus inhomogeneity, such as the above-described type of testing for radial variations of velocity, which can be applied to both monopole and dipole data. Second there is a test for isotropy versus anisotropy, such as described above, applied only to dipole data.

As above, the test for inhomogeneity on monopole data comprises a test for differences in monopole compressional slowness near and far from the borehole. Measured transit times, or differential transit times, are tested for deviations from a linear trend (predicted by a homogeneous isotropic model). Also as above, the test for inhomogeneity on dipole data comprises a test for deviation of a measured flexural dispersion curve from a library of known flexural dispersion curves belonging to the homogeneous isotropic model (see e.g. FIG. 10). The measured flexural dispersion curve can be the output of a known dispersion analysis algorithm (see, for example, Ekstrom, M. P., 1995, Dispersion Estimation From Borehole Acoustic Arrays Using A Modified Matrix Pencil Algorithm: 29th Asilomar Conf. Signals Sys, and Compt, Pacific Grove, Calif., October 31). The measured flexural dispersion with error bars is tested for whether it belongs to the known family of curves corresponding to the homogeneous isotropic model, or not.

Following the test for inhomogeneity versus homogeneity, a test is performed for isotropy versus anisotropy. In the present embodiment, and as described in the examples above, this test is only performed on dipole data. The test can be a statistically based test for the presence of one flexural shear (isotropic) versus two flexural shear waves (anisotropic). This can be implemented using comparison of a simple model (one wave present) versus a more complex model (two waves present), and selection of the model using a likelihood factor, as illustrated in FIG. 16, which shows an example in which model order 2 indicates that the estimate of two dispersion curves fits the data best; i.e., has the largest "evidence". An alternative is to use cross-line energy as a test statistic and employ a threshold to decide between anisotropy and isotropy; a technique that is already used as a qualitative indicator of anisotropy. In addition, if Stoneley wave slowness data is available, that information can be incorporated as a constraint on the shear slowness.

Figure 17:
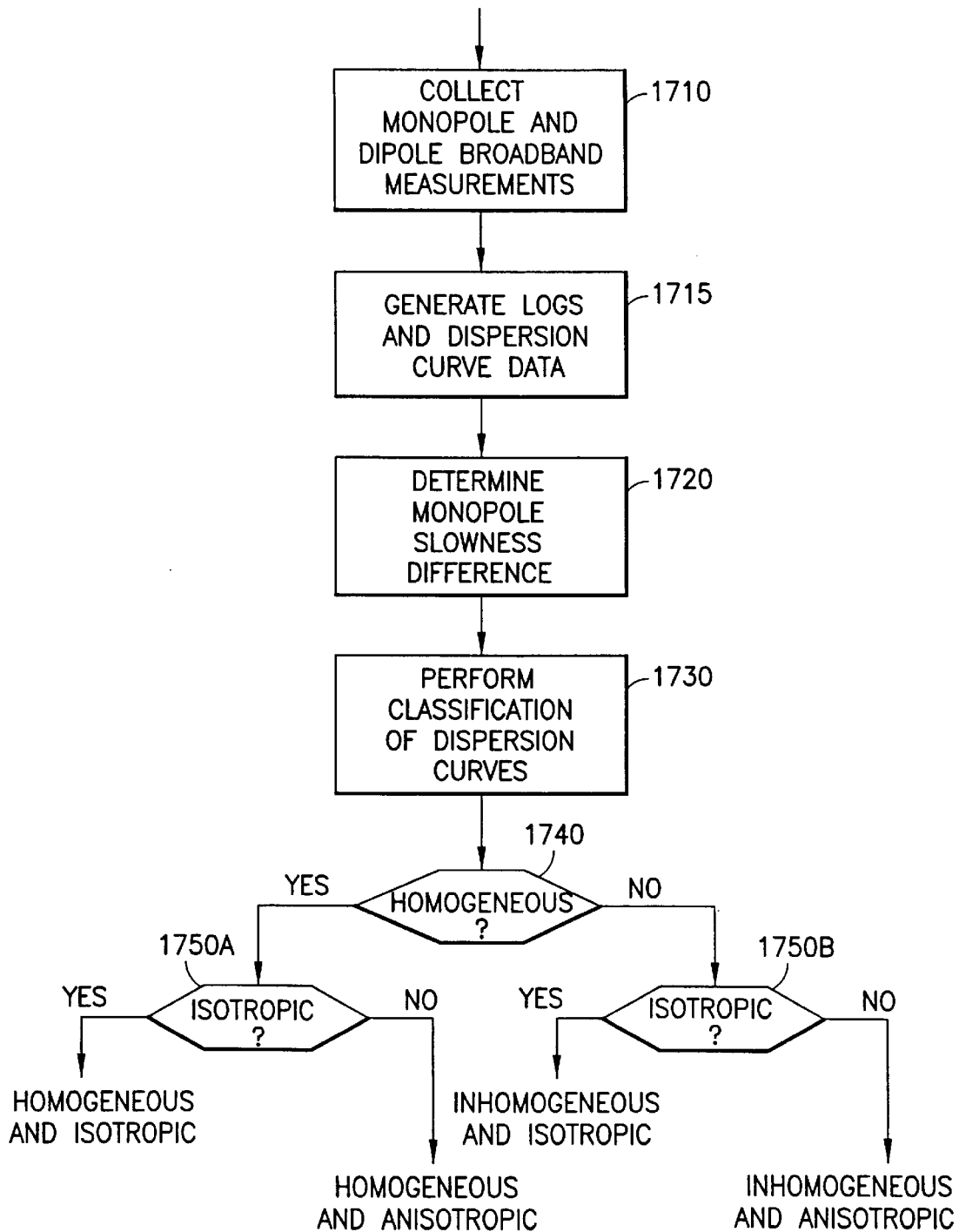
FIG. 17 is a flow diagram of a routine for programming a processor to implement a routine in accordance with an embodiment hereof.

FIG. 17 is a flow diagram that represents the processing chain, and which can be used in programming a suitable processor, such as the processor 270 of the surface equipment of FIG. 1 or a remote processor, in practicing an embodiment hereof. The block 1710 represents the collection of the data signals. A downhole processor could also perform at least part of the technique. The data may, for example, be collected and stored using the logging apparatus described in conjunction with FIGS. 1–4, although it will be understood that other suitable equipment can be utilized. The data in the present embodiment includes both monopole and dipole broadband measurements.

The block 1715 represents the generating of the logs (e.g. in FIGS. 7, 11A, 12A, 13A and 14A) and the actual and model dispersion curves (e.g. in FIGS. 8–10, 11B, 12B, 13B and 14B) from the collected measurement data. The block 1720 represents determination of the monopole slowness difference for the relevant depth range, for example, the slowness difference of FIGS. 11A, 12A, 13A or 14A. The block 1730 represents performance of classification of the dispersion curves as was explained in conjunction with FIGS. 11B, 12B, 13B and 14B, and which can utilize, for example, the type of technique described in conjunction with FIG. 16. The decision block 1740 represents the determination of whether the formation is homogeneous. In the present embodiment, the prior determination of block 1720 is utilized, together with a predetermined threshold, to make a determination of homogeneity/inhomogeneity, for example by determining whether the difference in slowness (as between the relatively short and relatively long T/R spacing measurements of slowness), and deeming the formation homogeneous if the difference does not exceed the predetermined threshold. It will be understood, however, that the degree of inhomogeneity, which will be related to the magnitude of the stated difference, can also be output. [Also, as noted above, a dipole dispersion versus model can also be used as an inhomogeneity indicator.] Determination is then made (decision block 1750, shown as two separate blocks, 1750A and 1750B in the diagram of FIG. 17) is then entered for a determination of whether the formation is isotropic or anisotropic. In the present embodiment, this determination can depend on the previously performed classification of dispersion curves (block 1730) using, for example, the rules described in conjunction with the examples of FIGS. 11B, 12B, 13B, and 14B. It will be understood that the degree of anisotropy can also be quantified, based, for example, on the extent of separation of the dispersion curves. As seen in FIG. 17, depending on the outputs of decision blocks 1750A and 1750B, the characterization of the formation is made as one of: homogeneous/isotropic, homogeneous/anisotropic, inhomogeneous/isotropic, or inhomogeneous/anisotropic. These characterizations can be read out, and the next depth level of interest processed in similar manner.

In accordance with an embodiment of the invention, detection of inhomogeneity (e.g. detection of alteration around the borehole resulting from fluid invasion or from stress concentration around the wellbore) includes determination of changes in the measured slowness as the transmitter-to-receiver (TR) spacing is varied. An existing model would naturally predict, for a ramp-shaped velocity profile, a decrease in measured slowness as the TR spacing is increased. However, Applicant has noted that a problem with using transit time estimates to detect changes in slowness is complicated by the presence of borehole and formation effects as well as gross errors that can occur in transit time estimates as a result, for example, of cycle skips. A feature hereof is the robust determination of alteration around the borehole, even in the presence of these complicating effects.

In an embodiment of the invention, the problem of detecting radial alteration (a radial decrease of slowness) in the near wellbore region is recast as a problem of detecting a variation in measured slowness at different TR spacings. It can be noted that the approach of this embodiment applies only to the case where the slowness decreases with increasing radius; that is, away from the borehole.

Figure 18:
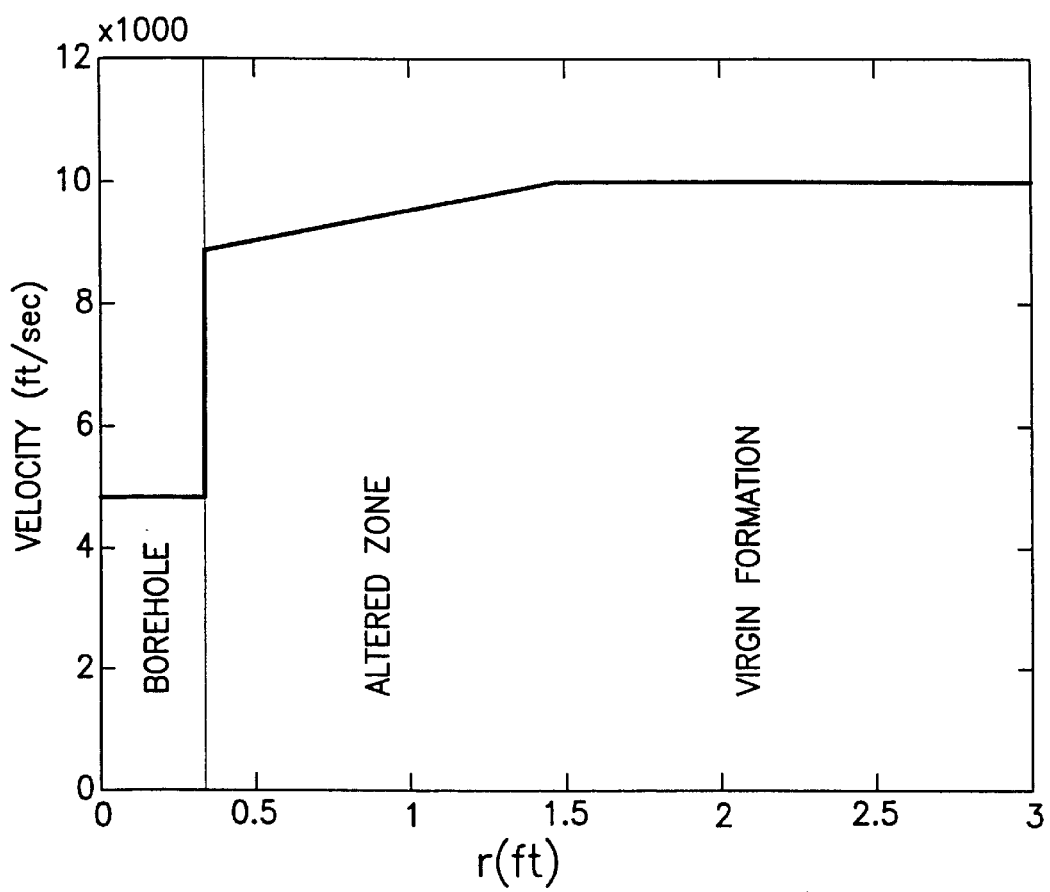
FIG. 18 is a diagram of an example of a linear radial profile of velocity around the borehole.

Consider first an idealized case, with a perfect borehole and with no lateral variations in slowness in the formations. FIG. 18 shows a linear radial profile of velocity around the borehole. In this example the velocity at the borehole wall (r≈0.35 ft) is about 9000 ft/sec and the velocity in the virgin formation (starting at r≈1.5 ft) is about 10,000 ft/sec, with the velocity increasing linearly in the alteration region.

Figure 19:
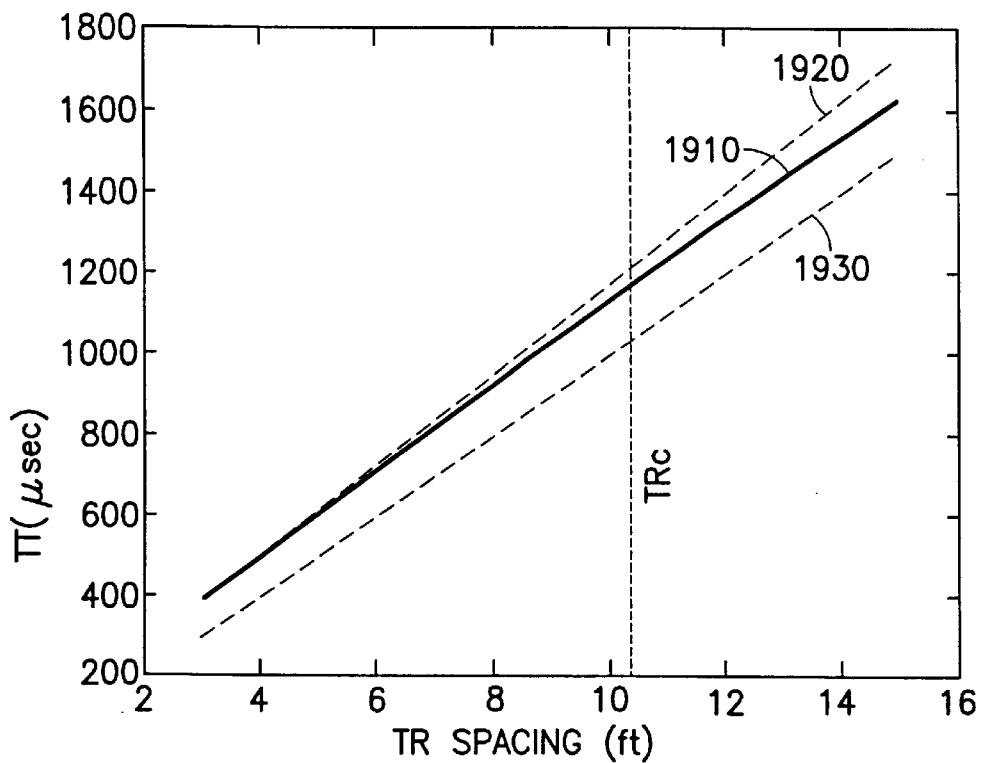
FIG. 19 illustrates the variation of transit time with transmitter-to-receiver spacing for the linear radial profile of FIG. 18.
Figure 20:
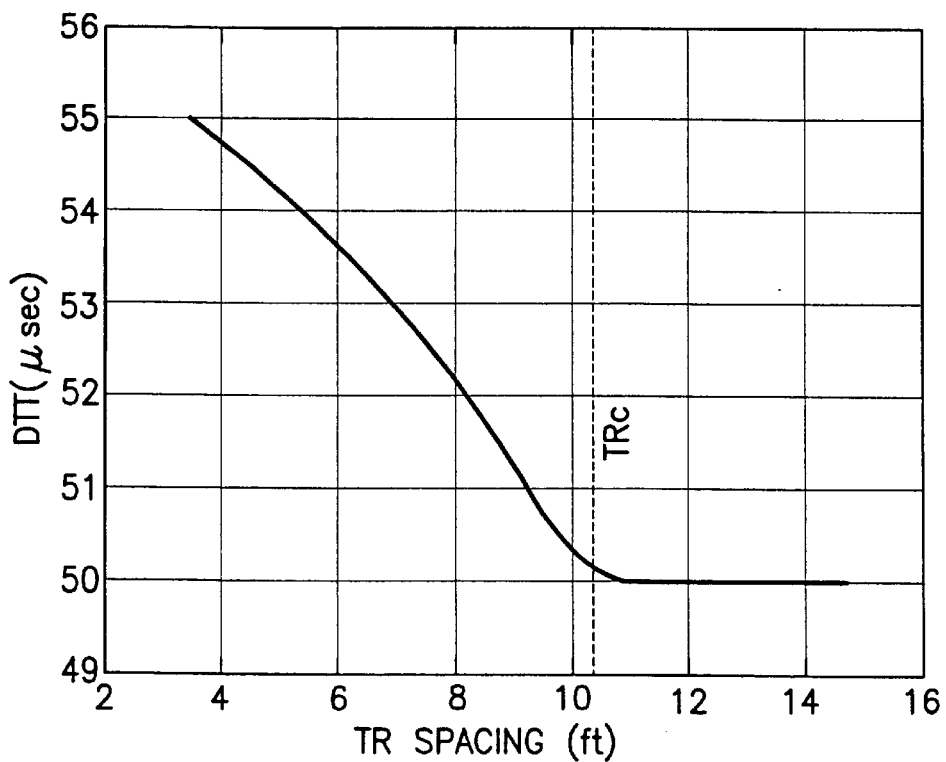
FIG. 20 shows differential transit time as a function of transmitter-to-receiver spacing for the transit times of FIG. 19.

FIG. 19 illustrates (solid line curve 1910) the variation of transit time (TT) with TR spacing for the linear radial profile of FIG. 18. (The corresponding curves, actually straight lines, shown in dashed line, for homogeneous profiles with borehole wall velocity (1920) and virgin formation (1930) are presented for comparison.) As seen, the curve 1910 deviates from linear moveout with TR spacing. This is readily observed in FIG. 20, which shows the differential transit time (DTT) as a function of TR spacing for ½ ft. spacings. The derivative of the transit time with respect to TR spacing or measured slowness shows a monotonic decline until about $TR_c$ which, in both FIGS. 19 and 20, is the minimum TR spacing at which modeled sonic energy rays penetrate the virgin formation.

In actuality, the TR spacing is not continuously varied, but rather is available for certain discrete values which depend on the transmitter and receiver placements on the logging tool. Therefore, as in FIG. 20, differential transit time, derived from differences between transit times for adjacent receivers for a given transmitter, can be plotted against the average TR spacing of the receivers (½ ft., in this example). It can be noted that the differential transit time exhibits a clear signature of a monotonically decreasing trend leveling out to a constant value which is the virgin slowness. This provides a basis for devising a detector for radial alteration.

In the present embodiment, an alteration detector is established to solve a hypothesis testing problem based on the above-described differential transit times. It seeks to decide between the following two hypotheses, H0, H1:

H0: DTT—constant

H1: DTT—decreasing trend with TR.

In this embodiment there is no assumption of a particular radial slowness profile, only that slowness decreases with increasing radius so as to produce a decreasing trend in measured slowness with TR spacing. The detected signals include measurement errors, and a noise component is included in the model.

To a first order, a decreasing trend can be fitted by a line with a negative slope. For this case, the above hypotheses can be cast as follows:

H0: DTT=s+N

H1: DTT=mTR+c+N, m<0

Where s, c are constants, m is the slope, and N is the measurement error (noise).

Although the foregoing does not necessarily precisely fit the actual DTT relationship in an alteration, it does capture the behavior to first order and is relatively easy to solve for a test statistic.

The Generalized Likelihood Ratio Test (GLRT) for the above problem with independent identically distributed (i.i.d.) normal errors yields the following test statistic, $T_1$.

$$T_1 = \frac{\sum_i (DTT_i - \overline{DTT})^2}{\min_{m<0,c} \sum_i (DTT_i - mTR_i - c)^2} \quad (1)$$

If the errors are not i.i.d, the above statistic can be modified by suitably incorporating the covariance matrix of the errors as weighting coefficients in the terms of the sums, i.e., $$T_1 = \frac{\sum_i W_{ii}(DTT_i - \overline{DTT})^2}{\min_{m<0,c} \sum_i W_{ii}(DTT_i - mTR_i - c)^2} \quad (1A)$$

Where $W=R^{-1}$ is the inverse of the covariance matrix R, $W_{ii}$ being the weighting coefficients on the diagonal of W.

The test consists of comparing the statistic to a threshold τ which is chosen based on a desired level of false alarms (detection of altered zone where there is none) and choosing H0 when the threshold is exceeded. This can be written as $$T_1 \overset{H_1}{\underset{H_0}{\gtrless}} \tau \quad \text{which is interpreted as } T_1 < \tau \Rightarrow H_0, T_1 > \tau \Rightarrow H_1 \quad (2)$$

In a further form of the present embodiment of the invention, the test statistic can be refined further by noting that the next order fit, especially when there are constant regions in the DTT curve, is a piecewise fit with a monotonic decreasing trend in the smaller TR spacings and with a constant for the longer TR spacings, such that the whole function is monotonic decreasing. This yields the following test statistic $$T_1 = \frac{\sum_i (DTT_i - \overline{DTT})^2}{\min_{R_c,c_1,m<0,c_0<mR_c+c_1} \sum_i (DTT_i - p_{R_c,m,c_0,c_1}(TR_i))^2} \quad (3)$$

where $$p_{R_c,m,c_0,c_1}(x) = \begin{cases} mx + c_1, & x < R_c \\ c_0, & x \geq R_c \end{cases} \quad (4)$$

Figure 21:
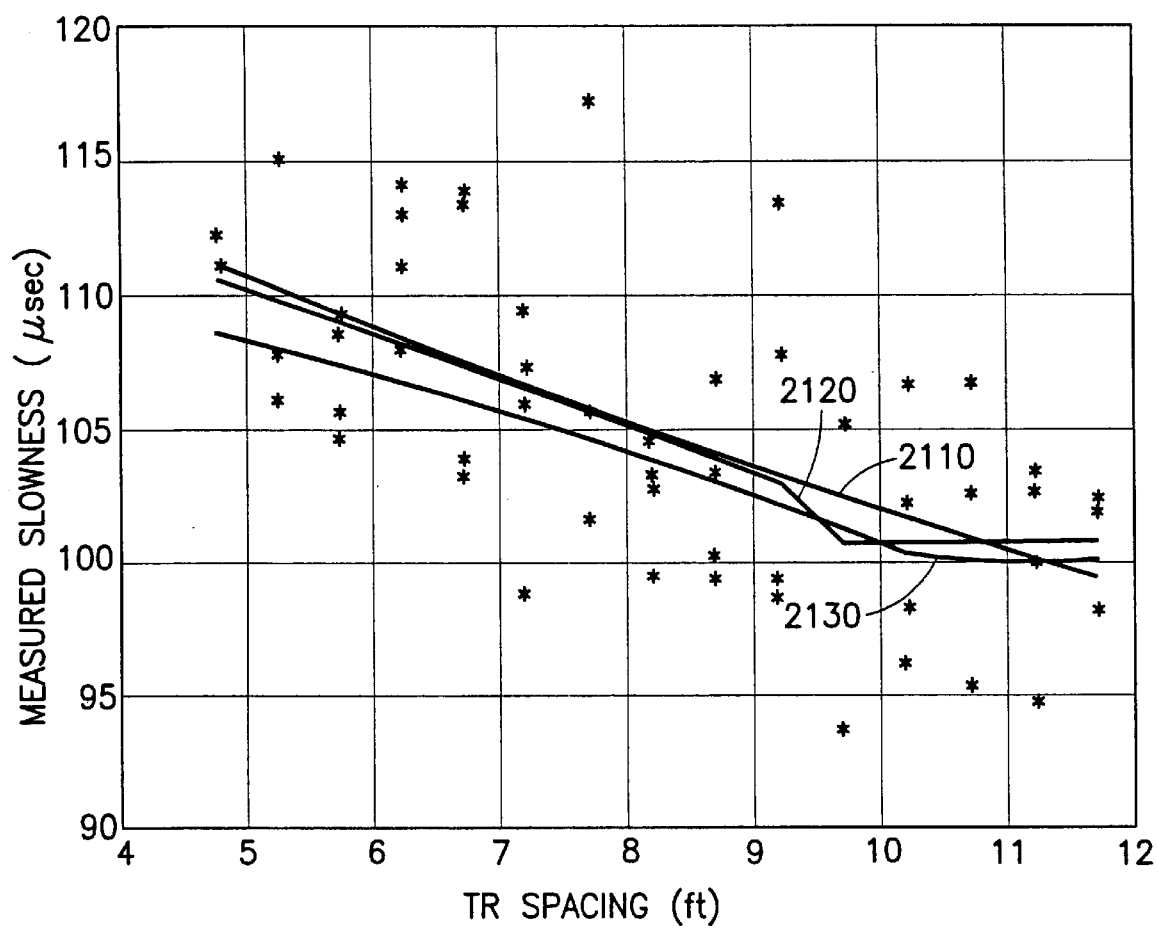
FIG. 21 shows best fit outcomes for exemplary data showing how two test statistics can be fitted to data.

In practice, $R_c$ is chosen to fall in the middle third of the range of TR spacings so as to have enough points for statistical stability. FIG. 21 illustrates the way the straight line and the piecewise straight line are fitted to the data (the star points representing simulated data, including noise) while obtaining $T_1$ and $T_2$. The Figure shows best fit outcomes for $T_1$ (curve 2110) and $T_2$ (curve 2120). The expected error free measurement is shown at curve 2130.

Since there are two test statistics $T_1$ and $T_2$, each of which is appropriate in a particular scenario, they can be combined, and the problem can be expressed as that of choosing between three hypotheses:

H0: DTT—constant

H11: DTT—decreasing linear trend with TR

H12: DTT—decreasing piecewise linear and constant trend.

This problem can be solved using the GLRT approach by introducing two threshold numbers $\tau_0$ and $\tau_{12}$ and implementing $$\max = (T_1 * \tau_{12}, T_2) \overset{H_1}{\underset{H_0}{\gtrless}} \tau_0, \frac{T_2}{T_1} \overset{H_{12}}{\underset{H_{11}}{\gtrless}} \tau_{12} \quad (5)$$

Numerical simulations using the present embodiment have shown that the performance of the more complex detector based on both $T_1$ and $T_2$ for detecting alteration may not be significantly superior to that based on $T_1$ alone. Accordingly, a variation of the present embodiment uses $T_1$ alone to detect alteration and uses the ratio of $T_2$ to $T_1$ to detect the virgin zone.

The threshold numbers $\tau_0$ and $\tau_{12}$ are preferably chosen to control the probabilities of false alarm (detecting alteration where none is present) and misclassification (finding a leveling out when the actual trend is a continuous decrease). Thus, it is advantageous to know the distributions of these test statistics. It is possible to characterize the distribution of the test statistic $T_1$ under H0 with Gaussian errors. It can be shown to have a distribution which is a (½, ½) mixture of a point mass at 1 and a shifted F-distribution. This does not depend on the variance of the error and therefore allows a pre-computation of the threshold for fixing the false alarm rate. The distribution of the test statistic $T_2$ is more complex and, at present, can be selected on the basis of tests and heuristics.

Figure 22:
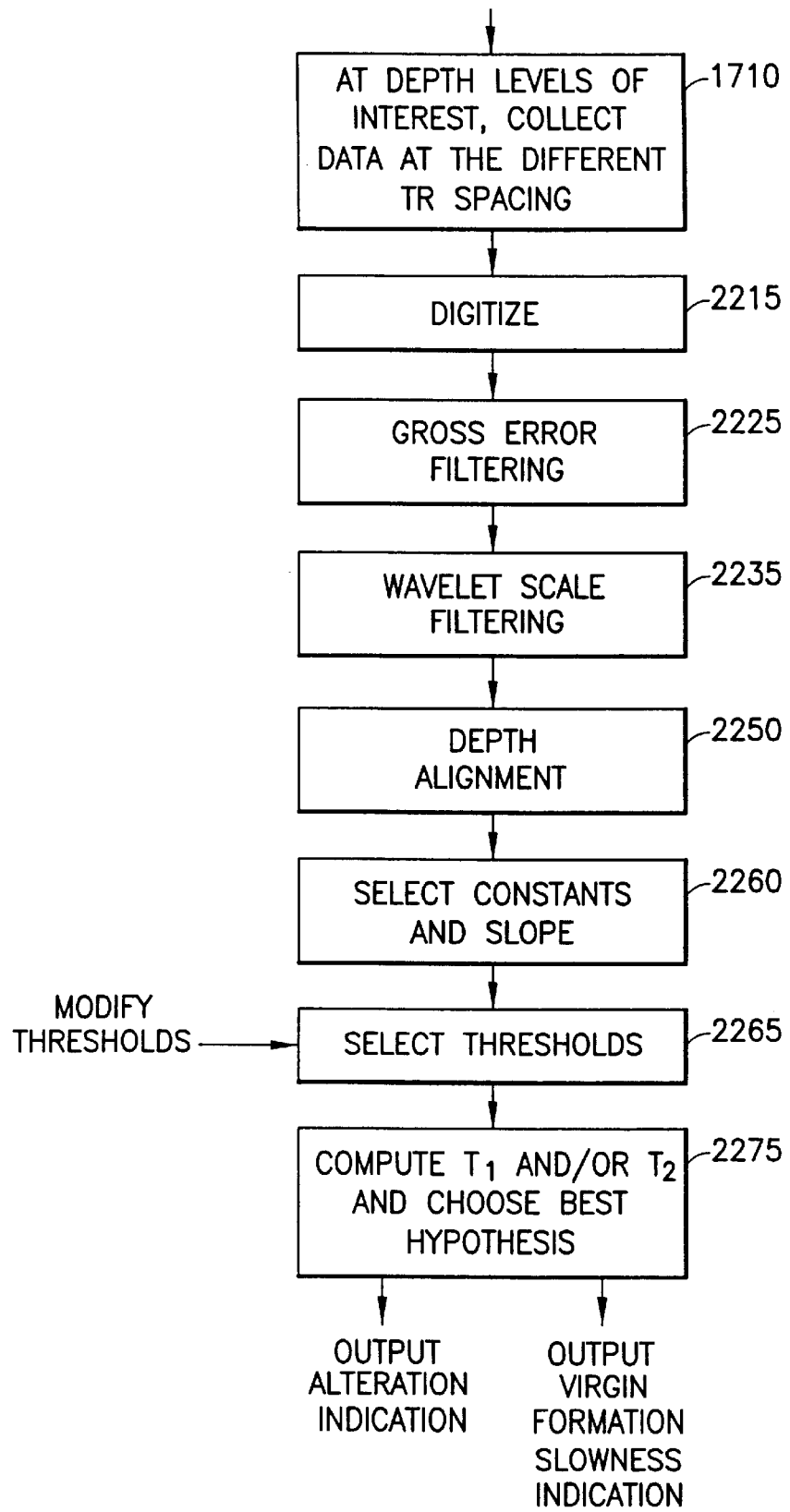
FIG. 22 is a flow diagram of a routine, in accordance with an embodiment of the invention, for determining alteration around the borehole and virgin formation slowness.

It is seen from equation (2) that the best fit for the $T_2$ statistic incorporates a constant fit at long TR spacings. This provides an estimate of the virgin slowness when the test for virgin zone picks H12. Referring to FIG. 22, there is shown a flow diagram of a routine for determination of alteration detection that can be used, inter alia, as an input to homogeneity determination (e.g. blocks 1720 and 1740) of FIG. 17. As above, the block 1710 represents collection of the logging data. In the present embodiment, compressional transit time measurements are derived from several different TR spacings. As above noted, such as in conjunction with FIG. 4, the data is digitized and processed (block 2215). As represented by the block 2225 blocks of data are subjected to gross error filtering, which removes data points that are grossly inconsistent with neighboring data. Wavelet scale filtering can then be implemented, as represented by the block 2235. Depth alignment, from measurements at different spacings, can then be performed, as represented by the block 2250, and DTT versus TR is obtained (e.g. in the graph of FIG. 19). The constants s and c are selected and the negative slope m is initialized, as represented by the block 2260. Also, the threshold τ, $\tau_0$, and $\tau_{12}$ are selected (block 2265). Then, as represented by the block 2275, the test statistics $T_1$ and/or $T_2$ can then be computed, in accordance with equations (1), (1A), and (3), and the hypotheses from among H0, H1 and/or H0, H11, and H12 can be chosen in accordance with the threshold determinations (2) and/or (5). This can be used to provide a general and/or specific (e.g. from the quantified test statistics, which can also be produced using modified constants and slopes, as indicated) indications of alteration, as an inhomogeneity indicator. Also, as seen from equation (2), the best fit for the test statistic $T_2$ incorporates a constant fit at long TR spacings. This provides an estimate of the virgin slowness when the test for the virgin zone selects hypothesis $H_{12}$. Thus, for instance, in the example of FIG. 21, the piecewise fit has a constant slowness (as a function of TR spacing) in the virgin zone of about 101 usec/ft.

The foregoing technique is illustrated in terms of compressional waves, but can be applicable to other sonic waves, an example being shear headwaves in a fast formation.

What is claimed is:

1. A method for determining alteration of a region of an earth formation surrounding an earth borehole, comprising the steps of:
   providing a logging device that is moveable through the borehole;
   transmitting sonic energy into the formation and receiving, at a plurality of transmitter-to-receiver spacings on said logging device, sonic energy that has traveled through the formation, and producing signals representative of the received sonic energy for said plurality of transmitter-to-receiver spacings;
   determining, from said signals, sonic transit times and differential transit times for the respective transmitter-to-receiver spacings;
   deriving a test statistic from said differential transit times; and
   determining the presence of alteration of a region of the formations from said test statistic.

2. The method as defined by claim 1, wherein said determined sonic transit times and differential transit times are sonic compressional transit times and sonic compressional differential transit times.

3. The method as defined by claim 1, wherein said step of determining the presence of alteration of a region of the formations from said test statistic comprises comparing said test statistic to a threshold.

4. The method as defined by claim 2, wherein said step of determining the presence of alteration of a region of the formations from said test statistic comprises comparing said test statistic to a threshold.

5. The method as defined by claim 1, wherein said test statistic includes a component that depends on the degree to which the differential transit times decrease monotonically as a function of transmitter-to-receiver spacing.

6. The method as defined by claim 2, wherein said test statistic includes a component that depends on the degree to which the differential transit times decrease monotonically as a function of transmitter-to-receiver spacing.

7. The method as defined by claim 2, wherein said test statistic includes a component that depends on the degree to which the differential transit times, as a function of transmitter-to-receiver spacing, corresponds to a line of negative slope.

8. The method as defined by claim 2, wherein said test statistic includes components that depend on the degree to which the differential transit times, as a function of transmitter-to-receiver spacing, corresponds to a line of negative slope followed by a line of substantially zero slope.

9. The method as defined by claim 2, further comprising determining the compressional slowness of the virgin earth formation from said test statistic.

10. The method as defined by claim 8, further comprising determining the compressional slowness of the virgin earth formation from said test statistic.

11. The method as defined by claim 1, wherein said test statistic $T_1$ is of the form $$T_1 = \frac{\sum_i (DTT_i - \overline{DTT})^2}{\min_{m<0,c} \sum_i (DTT_i - mTR_i - c)^2}$$

where $DTT_i$ are the individual differential transit times, $\overline{DTT}$ is the average of the differential transit times, $TR_i$ are the individual transmitter-to-receiver spacings, and m and c are constants.

12. The method as defined by claim 2, wherein said test statistic $T_1$ is of the form $$T_1 = \frac{\sum_i (DTT_i - \overline{DTT})^2}{\min_{m<0,c} \sum_i (DTT_i - mTR_i - c)^2}$$

where $DTT_i$ are the individual differential transit times, $\overline{DTT}$ is the average of the differential transit times, $TR_i$ are the individual transmitter-to-receiver spacings, and m and c are constants.

13. The method as defined by claim 2, wherein said test statistic $T_1$ is of the form $$T_1 = \frac{\sum_i W_{ii}(DTT_i - \overline{DTT})^2}{\min_{m<0,c} \sum_i W_{ii}(DTT_i - mTR_i - c)^2}$$

where $DTT_i$ are the individual differential transit times, $\overline{DTT}$ is the average of the differential transit times, $TR_i$ are the individual transmitter-to-receiver spacings, m and c are constants, and $W_{ii}$ are weighing coefficients on the diagonal of the inverse of the covariance matrix.

14. The method as defined by claim 2, wherein said test statistic $T_1$ is of the form $$T_1 = \frac{\sum_i (DTT_i - \overline{DTT})^2}{\min_{R_c, c_1, m<0, c_0 < mR_c + c_1} \sum_i (DTT_i - p_{R_c, m, c_0, c_1}(TR_i))^2}$$

where $$p_{R_c, m, c_0, c_1}(x) = \begin{cases} mx + c_1, & x < R_c \\ c_0, & x \geq R_c \end{cases}$$

where $DTT_i$ are the individual differential transit times, $\overline{DTT}$ is the average of the differential transit times, $TR_i$ are the individual transmitter-to-receiver spacings, and m, $c_0$, $c_1$, and $R_c$ are constants.

15. Apparatus for determining alteration of a region of an earth formation surrounding an earth borehole, comprising:
   a logging device that is moveable through the borehole;
   means on said logging device for transmitting sonic energy into the formation and receiving, at a plurality of transmitter-to-receiver spacings on said logging device, sonic energy that has traveled through the formation, and for producing signals representative of the received sonic energy for said plurality of transmitter-to-receiver spacings;
   means for determining, from said signals, sonic transit times and differential transit times for the respective transmitter-to-receiver spacings;
   means for deriving a test statistic from said differential transit times; and
   means for determining the presence of alteration of a region of the formations from said test statistic.

16. Apparatus as defined by claim 15, wherein said means for determining the presence of alteration of a region of the formations from said test statistic comprises means for comparing said test statistic to a threshold.

17. A method for determining alteration of a region of the earth formation, for use in conjunction with a technique for sonic logging of an earth formation that includes: providing a logging device that is moveable through the borehole; transmitting sonic energy into the formation and receiving, at a plurality of transmitter-to-receiver spacings, sonic energy that has traveled through the formation, and producing signals representative of the received sonic energy for said plurality of transmitter-to-receiver spacings; comprising the steps of:

determining, from said signals, sonic transit times and differential transit times for the respective transmitter-to-receiver spacings;

deriving a test statistic from said differential transit times; and determining the presence of alteration of a region of the formations from said test statistic.

18. The method as defined by claim 17, wherein said determined sonic transit times and differential transit times are sonic compressional transit times and sonic compressional differential transit times.

19. The method as defined by claim 17, wherein said step of determining the presence of alteration of a region of the formations from said test statistic comprises comparing said test statistic to a threshold.

20. The method as defined by claim 17, wherein said test statistic includes a component that depends on the degree to which the differential transit times decrease monotonically as a function of transmitter-to-receiver spacing.

21. The method as defined by claim 17, wherein said test statistic includes a component that depends on the degree to which the differential transit times, as a function of transmitter-to-receiver spacing, corresponds to a line of negative slope.

22. The method as defined by claim 17, wherein said test statistic includes components that depend on the degree to which the differential transit times, as a function of transmitter-to-receiver spacing, corresponds to a line of negative slope followed by a line of substantially zero slope.

23. The method as defined by claim 18, further comprising determining the compressional slowness of the virgin earth formation from said test statistic.

24. The method as defined by claim 17, wherein said test statistic $T_1$ is of the form $$T_1 = \frac{\sum_i (DTT_i - \overline{DTT})^2}{\min_{m<0,c} \sum_i (DTT_i - mTR_i - c)^2}$$

where $DTT_i$ are the individual differential transit times, $\overline{DTT}$ is the average of the differential transit times, $TR_i$ are the individual transmitter-to-receiver spacings, and m and c are constants.

25. The method as defined by claim 17, wherein said test statistic $T_1$ is of the form $$T_1 = \frac{\sum_i W_{ii}(DTT_i - \overline{DTT})^2}{\min_{m<0,c} \sum_i W_{ii}(DTT_i - mTR_i - c)^2}$$

where $DTT_i$ are the individual differential transit times, $\overline{DTT}$ is the average of the differential transit times, $TR_i$ are the individual transmitter-to-receiver spacings, m and c are constants, and $W_{ii}$ are weighing coefficients on the diagonal of the inverse of the covariance matrix.

26. The method as defined by claim 17, wherein said test statistic $T_1$ is of the form $$T_1 = \frac{\sum_i (DTT_i - \overline{DTT})^2}{\min_{R_c,c_1,m<0,c_0<mR_c+c_1} \sum_i (DTT_i - p_{R_c,m,c_0,c_1}(TR_i))^2}$$

where $$p_{R_c,m,c_0,c_1}(x) = \begin{cases} mx + c_1, & x < R_c \\ c_0, & x \geq R_c \end{cases}$$

where $DTT_i$ are the individual differential transit times, $\overline{DTT}$ is the average of the differential transit times, $TR_i$ are the individual transmitter-to-receiver spacings, and m, $c_0$, $c_1$, and $R_c$ are constants.

27. A method for determining whether a region of an earth formation surrounding an earth borehole is homogeneous, comprising the steps of:

providing a logging device that is moveable through the borehole;

transmitting sonic energy into the formation and receiving, at a plurality of transmitter-to-receiver spacings on said logging device, sonic energy that has traveled through the formation, and producing signals representative of the received sonic energy for said plurality of transmitter-to-receiver spacings;

determining, from said signals, sonic transit times and differential transit times for the respective transmitter-to-receiver spacings;

deriving a test statistic from said differential transit times; and determining, from said test statistic, whether said region of the formation is homogeneous.

28. The method as defined by claim 27, wherein said determined sonic transit times and differential transit times are sonic compressional transit times and sonic compressional differential transit times.

29. The method as defined by claim 27, wherein said step of determining, from said test statistic, whether said region of the formation is homogeneous, comprises comparing said test statistic to a threshold.

30. The method as defined by claim 27, wherein said test statistic includes a component that depends on the degree to which the differential transit times decrease monotonically as a function of transmitter-to-receiver spacing.

31. The method as defined by claim 27, wherein said test statistic includes a component that depends on the degree to which the differential transit times, as a function of transmitter-to-receiver spacing, corresponds to a line of negative slope.

32. The method as defined by claim 27, wherein said test statistic includes components that depend on the degree to which the differential transit times, as a function of transmitter-to-receiver spacing, corresponds to a line of negative slope followed by a line of substantially zero slope.

33. The method as defined by claim 27, wherein said test statistic $T_1$ is of the form $$T_1 = \frac{\sum_i (DTT_i - \overline{DTT})^2}{\min_{m<0,c} \sum_i (DTT_i - mTR_i - c)^2}$$

where $DTT_i$ are the individual differential transit times, $\overline{DTT}$ is the average of the differential transit times, $TR_i$ are the individual transmitter-to-receiver spacings, and m and c are constants.

34. The method as defined by claim 27, wherein said test statistic $T_1$ is of the form $$T_1 = \frac{\sum_i W_{ii}(DTT_i - \overline{DTT})^2}{\min_{m<0,c} \sum_i W_{ii}(DTT_i - mTR_i - c)^2}$$

where $DTT_i$ are the individual differential transit times, $\overline{DTT}$ is the average of the differential transit times, $TR_i$ are the individual transmitter-to-receiver spacings, m and c are constants, and $W_{ii}$ are weighing coefficients on the diagonal of the inverse of the covariance matrix.

35. The method as defined by claim 27, wherein said test statistic $T_1$ is of the form $$T_1 = \frac{\sum_i (DTT_i - \overline{DTT})^2}{\min_{R_c, c_1, m<0, c_0 < mR_c + c_1} \sum_i (DTT_i - p_{R_c, m, c_0, c_1}(TR_i))^2}$$

where $$p_{R_c, m, c_0, c_1}(x) = \begin{cases} mx + c_1, & x < R_c \\ c_0, & x \geq R_c \end{cases}$$

where $DTT_i$ are the individual differential transit times, $\overline{DTT}$ is the average of the differential transit times, $TR_i$ are the individual transmitter-to-receiver spacings, and m, $c_0$, $c_1$, and $R_c$ are constants.

* * * * *